(12) United States Patent
Adams et al.

(10) Patent No.: US 11,044,107 B2
(45) Date of Patent: Jun. 22, 2021

(54) DEVICE AUTHENTICATION BASED ON ANALOG CHARACTERISTICS WITHOUT ERROR CORRECTION

(71) Applicant: Analog Devices, Inc., Wilmington, MA (US)

(72) Inventors: Robert W. Adams, Acton, MA (US); John Ross Wallrabenstein, West Lafayette, IN (US); Deniz Karakoyunlu, Cambridge, MA (US)

(73) Assignee: Analog Devices, Inc., Wilmington, MA (US)

( * ) Notice: Subject to any disclaimer, the term of this patent is extended or adjusted under 35 U.S.C. 154(b) by 222 days.

(21) Appl. No.: 15/968,496

(22) Filed: May 1, 2018

(65) Prior Publication Data

US 2019/0342104 A1 Nov. 7, 2019

(51) Int. Cl.
*H04L 9/32* (2006.01)
*H04L 9/08* (2006.01)

(52) U.S. Cl.
CPC .......... *H04L 9/3278* (2013.01); *H04L 9/0822* (2013.01); *H04L 9/0861* (2013.01); *H04L 2209/50* (2013.01)

(58) Field of Classification Search
CPC ................. H04L 9/3278; H04L 9/0822; H04L 9/0861; H04L 2209/50; H04L 2209/46; H04L 9/0866; H04L 2209/805
See application file for complete search history.

(56) References Cited

U.S. PATENT DOCUMENTS 6,714,120 B2  3/2004  Blama et al.
8,705,873 B2  4/2014  Voloshynovskiy et al.
(Continued)

FOREIGN PATENT DOCUMENTS

CN  103888266 A  6/2014
CN  105978694 A  9/2016
(Continued)

OTHER PUBLICATIONS

Devadas et al., Design and Implementation of PUF-Based "Unclonable" RFID ICs for Anti-Counterfeiting and Security Applications. 2008 IEEE International Conference on RFID. IEEE. 2008: p. 58-64.
Maiti et al., The impact of aging on an fpga-based physical unclonable function. 2011 International Conference on Field Programmable Logic and Applications (FPL). IEEE. 2011.
(Continued)

*Primary Examiner* — Cheng-Feng Huang
(74) *Attorney, Agent, or Firm* — Wolf, Greenfield & Sacks, P.C.

(57) ABSTRACT

This application describes systems and methods for using a physical unclonable function (PUF) to authenticate a device, which may include circuitry for generating PUF values that may uniquely identify the device. According to one aspect, the device may provide enrollment PUF values to an authentication device. The device may later be authenticated if PUF values generated by the device are within a threshold distance of the enrollment PUF values. Since the PUF values are compared using a distance, it may not necessary to apply an error correcting code to the PUF values. The enrollment values and/or the calculated distance may be adjusted to compensate for time variations in the PUF values due to circuit aging. Systems and methods are also described herein for authenticating the device without revealing new PUF values to any second party, for example using a cryptographic technique known as a garbled circuit.

20 Claims, 22 Drawing Sheets

(56) References Cited

U.S. PATENT DOCUMENTS

| | | | |
|---|---|---|---|
| 8,762,723 | B2 | 6/2014 | Yu et al. |
| 9,071,598 | B2 | 6/2015 | Ramzan et al. |
| 9,225,512 | B1* | 12/2015 | Trimberger ........... H04L 9/0866 |
| 9,276,739 | B2 | 3/2016 | Celik et al. |
| 9,401,804 | B2 | 7/2016 | Kolesnikov et al. |
| 9,571,276 | B2 | 2/2017 | Falk et al. |
| 9,917,820 | B1 | 3/2018 | Kolman et al. |
| 9,991,892 | B2 | 6/2018 | Wacquez et al. |
| 10,749,694 | B2 | 8/2020 | Adams et al. |
| 2009/0282259 | A1 | 11/2009 | Skoric et al. |
| 2011/0215829 | A1 | 9/2011 | Guajardo Merchan et al. |
| 2011/0216902 | A1* | 9/2011 | Kolesnikov ........... H04L 9/0631 380/47 |
| 2012/0183135 | A1 | 7/2012 | Paral et al. |
| 2013/0010957 | A1 | 1/2013 | Yu et al. |
| 2014/0091832 | A1 | 4/2014 | Gotze et al. |
| 2014/0093074 | A1* | 4/2014 | Gotze ................... H04L 9/3278 380/45 |
| 2014/0140513 | A1* | 5/2014 | BrightSky ............. H04L 9/3278 380/278 |
| 2014/0189890 | A1* | 7/2014 | Koeberl ................. G06F 21/70 726/34 |
| 2014/0325237 | A1 | 10/2014 | Van der Leest et al. |
| 2015/0101037 | A1* | 4/2015 | Yang ..................... H04L 9/3278 726/16 |
| 2015/0163211 | A1* | 6/2015 | Chellappa ........... H04L 63/0876 713/155 |
| 2015/0278527 | A1 | 10/2015 | Falk |
| 2015/0278551 | A1* | 10/2015 | Iyer ......................... G06F 21/70 726/2 |
| 2015/0349958 | A1* | 12/2015 | Lindell ..................... H04L 9/085 713/168 |
| 2016/0050070 | A1* | 2/2016 | Bohli ...................... H04L 9/083 713/168 |
| 2016/0156476 | A1* | 6/2016 | Lee ......................... H04L 9/088 380/44 |
| 2016/0182045 | A1 | 6/2016 | Mai et al. |
| 2016/0204781 | A1 | 7/2016 | Plusquellic et al. |
| 2016/0255154 | A1* | 9/2016 | Kim .................... H04L 63/1433 726/25 |
| 2017/0126415 | A1 | 5/2017 | Deyati et al. |
| 2017/0178710 | A1 | 6/2017 | Augustine et al. |
| 2018/0006813 | A1 | 1/2018 | Van der Leest et al. |
| 2018/0013779 | A1 | 1/2018 | Aguayo Gonzalez et al. |
| 2018/0019997 | A1 | 1/2018 | Chabanne et al. |
| 2018/0359082 | A1 | 12/2018 | Bos et al. |
| 2019/0068190 | A1 | 2/2019 | Karpinskyy et al. |
| 2019/0342105 | A1 | 11/2019 | Adams et al. |
| 2020/0280551 | A1 | 9/2020 | Wallrabenstein |

FOREIGN PATENT DOCUMENTS

| | | |
|---|---|---|
| CN | 106874799 A | 6/2017 |
| EP | 2 302 555 B1 | 10/2016 |
| WO | WO 2007/072450 A2 | 6/2007 |
| WO | WO 2017/123631 A1 | 7/2017 |

OTHER PUBLICATIONS

Rostami et al. Robust and Reverse-Engineering Resilient PUF Authentication and Key-Exchange by Substring Matching.

International Search Report and Written Opinion dated Sep. 22, 2019 in connection with International Application No. PCT/US2019/029077.

Hussain et al., SHAIP: Secure Hamming Distance for Authentication of Intrinsic PUFs. ACM Transactions on Design Automation of Electronic Systems. Dec. 31, 2018: 23(6): aRTICLE 75. Retrieved from the Internet: <htpp://www.aceslab.org/sites/default/files/SHAIP.pdf>.

Alam et al., Secure policy execution using reusable garbled circuit in the cloud. Future Generation Computer Systems. 2018: 87:488-501.

Bellare et al., Foundations of Garbled Circuits. ACM Conference on Computer and Communications Security. Oct. 1, 2012; 45 pages.

Goldwasser et al., Reusable Garbled Circuits and Succinct Functional Encryption. STOC. 2013; 1-10.

International Preliminary Report on Patentability dated Nov. 11, 2020 in connection with International Application No. PCT/US2019/029077.

* cited by examiner

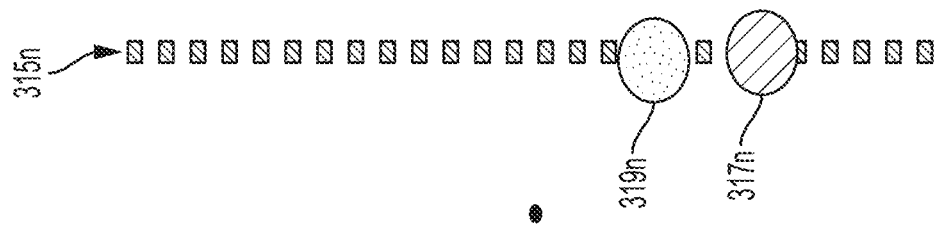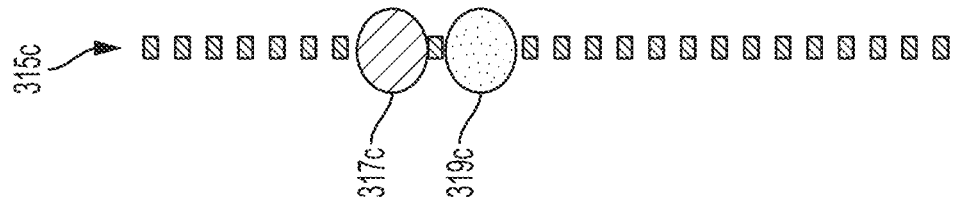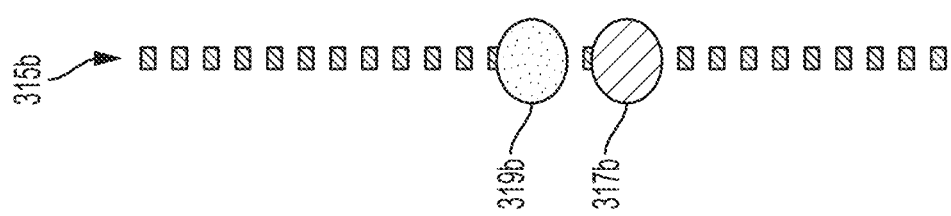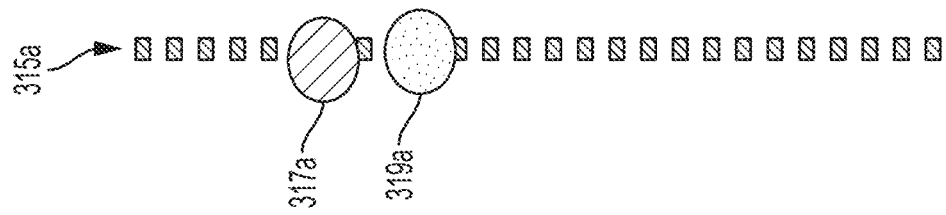
FIG. 3

DEVICE AUTHENTICATION BASED ON ANALOG CHARACTERISTICS WITHOUT ERROR CORRECTION

FIELD OF THE DISCLOSURE

The present disclosure relates to techniques for authenticating devices using physical unclonable functions.

BACKGROUND

Sensors and other devices may need to be authenticated. Authentication may ensure that a data source is transmitting data to a valid destination and that the data therefore remains secure. Authentication may also ensure that data is only received from trusted sources.

A physical unclonable function (PUF) includes circuitry configured to generate an output whose value depends on unique physical properties of the circuitry. Even tightly controlled manufacturing processes will include variations. Thus, even when circuit components are intended to have identical characteristics, these variations result in circuit components with unique characteristics.

SUMMARY OF THE DISCLOSURE

According to various aspects, systems and methods are provided for using a physical unclonable function to authenticate a device, which may include circuitry for generating PUF values that may uniquely identify the device. According to one aspect, the device may provide enrollment PUF values to an authentication device. The device may later be authenticated if PUF values generated by the device are within a threshold distance of the enrollment PUF values. Since the PUF values are compared using a distance, it may not necessary to apply an error correcting code to the PUF values. The enrollment values and/or the calculated distance may be adjusted to compensate for time variations in the PUF values due to circuit aging. Systems and methods are also described herein for authenticating the device without revealing new PUF values to any second party, for example using a cryptographic technique known as a garbled circuit.

According to one aspect of the present application, a system for authenticating a device is provided. The system includes processing circuitry configured to: obtain a physically unclonable function value comprising a plurality of bits representing a digitized value of a signal generated by PUF circuitry coupled to the device, obtain a stored enrollment value corresponding to the device, determine whether a distance between the PUF value and the enrollment PUF value exceeds a threshold, and in response to determining that the determined distance does not exceed the threshold, authenticate the device.

According to one aspect of the present application, a computer implemented method for authenticating a device is provided. The method includes obtaining a physically unclonable function value comprising a plurality of bits representing a digitized value of a signal generated by PUF circuitry coupled to the device, obtaining a stored enrollment PUF value corresponding to the device, determining whether a distance between the PUF value and the enrollment PUF value exceeds a threshold, and in response to determining that the determined distance does not exceed the threshold, authenticating the device.

According to one aspect of the present application, a system for authenticating a first device is provided. The system includes a physically unclonable function circuit, coupled to the first device, configured to generate an analog signal representing a value of the PUF circuit, an analog-to-digital converter configured to digitize the analog signal to produce a digital PUF value comprising a plurality of bits representing the analog signal, and a transmitter configured to transmit the digital PUF value to a second device for authenticating the first device against an enrollment PUF value.

According to one aspect of the present application, a method for authenticating a first device communicatively coupled to a second device is provided. The method includes using the first device to perform acts of: obtaining, via at least one network, parameters of a garbled circuit from the second device, the parameters comprising first input keys and second input keys, wherein the first input keys are encrypted, obtaining a physically unclonable function value comprising a plurality of bits representing a digitized value of a signal generated by a PUF circuitry coupled to the first device, generating an encryption key for the first device using the PUF value, decrypting at least some of the first input keys using the first device encryption key to obtain decrypted keys, evaluating the garbled circuit using the decrypted keys and the second input keys to obtain a garbled circuit output value, and transmitting, via the at least one network, the garbled circuit output value to the second device for authenticating the first device.

According to one aspect of the present application, a method for authenticating a first device communicatively coupled to a second device via at least one network is provided. The method including using the second device to perform the acts of: generating parameters of a garbled circuit, the parameters comprising first input keys and second input keys, transmitting, to the first device, the first input keys and the second input keys, receiving, from the first device, an output value of the garbled circuit, and authenticating the first device based on the output value of the garbled circuit.

According to one aspect of the present application, a method for authenticating a first device communicatively coupled to a second device via at least one network is provided. The method includes using the second device to perform the acts of: generating parameters of a garbled circuit, the parameters including first input keys and second input keys and transmitting, to the first device, via at least one network, the first input keys and the second input keys, wherein the first input keys are encrypted. The method further includes using the first device to perform acts of: receiving, from the second device, the first input keys and second input keys, obtaining a physically unclonable function value comprising a plurality of bits representing a digitized value of a signal generated by a PUF circuitry coupled to the first device, generating an encryption key for the first device using the PUF value, decrypting at least some of the first input keys using the first device encryption key to obtain decrypted keys, evaluating the garbled circuit using the decrypted keys and the second input keys to obtain a garbled circuit output value, and transmitting, via the at least one network, the garbled circuit output value to the second device for authenticating the first device. The method further includes using the second device to perform the acts of: receiving, from the first device, the output value of the garbled circuit and authenticating the first device based on the output value of the garbled circuit.

BRIEF DESCRIPTION OF THE DRAWINGS

Various aspects and embodiments of the disclosure will be described with reference to the following figures. It should be appreciated that the figures are not necessarily drawn to scale. Items appearing in multiple figures are indicated by the same reference number in all the figures in which they appear.

FIG. 3 shows an illustrative diagram of PUF output values that were measured or enrolled by an authentication device, in accordance with some embodiments.

DETAILED DESCRIPTION

Figure 1A:
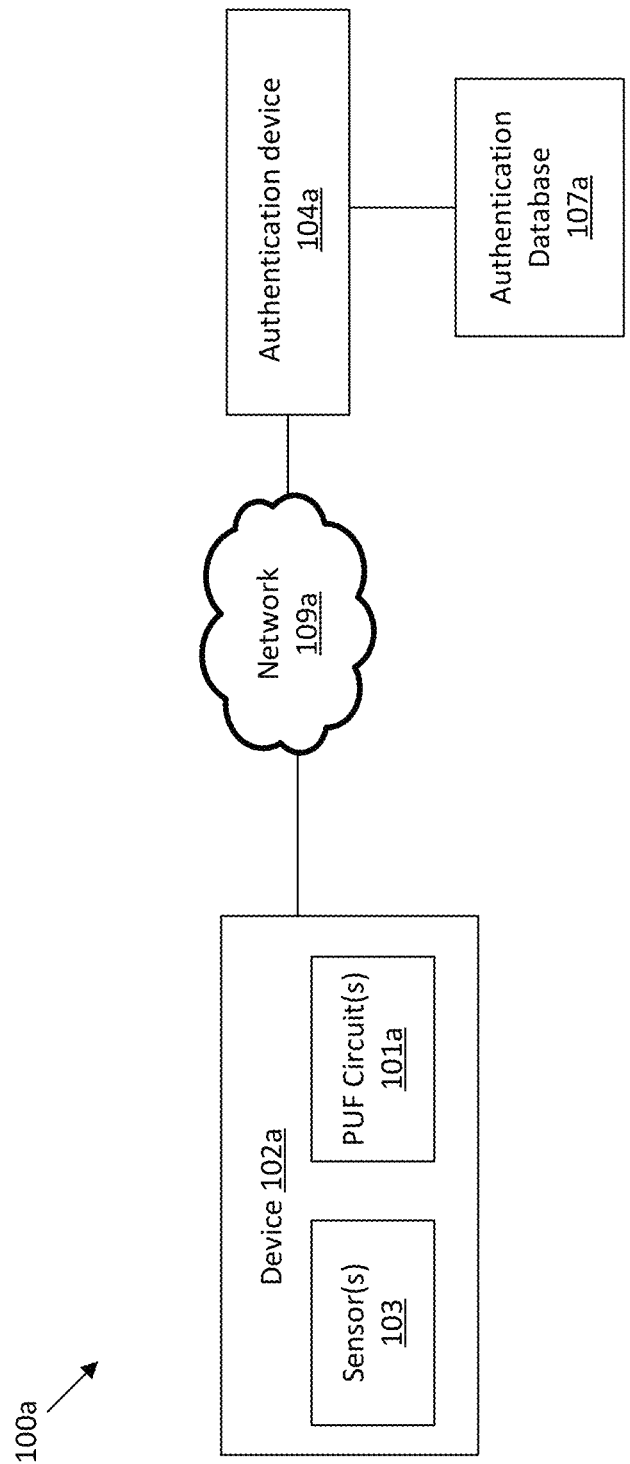
FIG. 1A shows an illustrative block diagram of a system including a device and an authentication device in which some of the technology described herein may operate, in accordance with some embodiments.

The inventors have recognized and appreciated that conventional techniques for authenticating devices using PUF values may be improved upon. Conventional PUF implementations may use binary PUFs that produce an array of 1's and 0's where each bit is derived from an analog value proportional to the mismatch between two or more semiconductor devices. These implementations are known to be sensitive to aging, and require error correction across several values. For example, PUF signals that are close to the threshold between zero and one may randomly be flipped between zero and one (e.g., due to measurement noise) without large changes to the underlying signal. As another example, over time, PUF circuitry aging may cause values generated by PUF circuitry to drift from an earlier recorded enrollment value. In binary PUF systems, aging may cause large errors from flipped bits and limit the useful life and the number of useful cells in the PUF systems. These conventional implementations require error correcting codes that can correct the flipped bits and may be costly to implement and impractical for certain devices.

Therefore, the inventors have developed a solution to these problems to improve PUF technology. A physical unclonable function implementation may utilize analog circuit signals that are digitized to form PUF values. Higher resolution digital PUF values may cause less quantization error than binary PUFs by reducing the distance between the analog signal and digital measurement as well reducing the impact of flipped bits. Higher resolution PUFs can uniquely identify a device but may be unable to generate exactly matching PUF values due to noise and other sources of error. According to some aspects, systems and methods are provided for authenticating PUF values using a distance calculation and without the use of an error correcting code. In some embodiments, a device may be authenticated without using error correction at least in part by: (1) obtaining a physically unclonable function value comprising a plurality of bits representing a digitized value of a signal generated by a PUF circuitry coupled to the device; (2) obtaining a stored enrollment value corresponding to the device, determining whether a distance between the PUF value and the enrollment value exceeds a threshold; and (3) in response to determining that the computed distance exceeds the threshold, authenticating the device.

The inventors have developed a solution to the problems of PUF circuit aging to improve PUF technology. A device may be authenticated by comparing recently generated PUF values to PUF values that were stored during an enrollment process. As the PUF circuits age, the PUF values generated by the PUF circuits may drift away from the enrollment values. Therefore, the systems and methods herein may also compensate for the aging of PUF circuitry by adjusting enrollment values and/or distances computed between new PUF values and enrollment PUF values. The drift caused by aging may be tracked and removed from distance calculations to extend the useful life of the device without requiring error correcting codes.

The inventors have also recognized and appreciated that conventional techniques for generating PUF values may be improved upon. In addition to authentication using the methods described above, which do not necessarily rely on bit-exact digitized PUF values, it may be beneficial to generate stable bit-exact binary codes that are immune to aging effects. However, conventional PUF implementations may use binary PUFs that are unstable due to sensitivity to noise and may generate substantial errors. As discussed above, PUF signals that are close to the threshold between zero and one may randomly be flipped between zero and one (e.g., due to measurement noise or aging) without large changes to the underlying signal.

Therefore, the inventors have developed a solution to address the problem of PUF circuit instability to improve PUF technology. Accordingly, systems and methods are described herein for identifying, from an array of PUF circuits, stable PUF circuits that are unlikely to see large effects from aging or noise, for example, circuits that can be expected to generate signals that have a stable most significant bit. For example devices described herein may identify a subset of PUF circuits of the plurality of PUF circuits, the subset of PUF circuits generating respective signals with amplitudes that exceed a threshold, select a PUF circuit from the subset of PUF circuits, and obtain the digitized value of the signal generated by the selected PUF circuit. The digitized values of the signals generated by the subset of PUF circuits may be combined to form a stable digital keyword.

The inventors have further recognized that conventional PUF implementations may be subject to a number of security vulnerabilities. Authentication may require passing encrypted messages and some implementations may be sensitive to having data stolen by an adversary. For example, if messages used in authentication are stolen by an eavesdropping adversary, the adversary may be able to replay the messages or otherwise impersonate the device and achieve authentication of an inauthentic device. Furthermore, although PUFs may be used to avoid storing keywords in memory, some PUF implementations may require stored PUF values to enroll and later authenticate a device. However, this storage may be compromised by an adversary who may steal the enrolled PUF values and use them to successfully impersonate valid devices.

Therefore, the inventors have developed a solution to address the problem of using PUF circuit to generate encryption keys in order to improve PUF technology. Stable PUF circuits may be identified and used to generate cryptographic keys based on the stable portions of the values output by the PUF circuits. These stable values may be used to separately generate corresponding encryption keys at two devices, one storing enrollment values and the other coupled to the PUF circuits. Thus either device may receive an encrypted message, obtain a plurality of PUF values, generate a decryption key based on the stored PUF values, and decrypt the encrypted message with the decryption key. Stable PUF circuits may be used in a fixed order to generate the encryption keys. One of the devices may select an ordering for the PUF circuits, and the order may be changed for each key generated.

In some embodiments, in order to improve PUF technology and address the potential theft of stored PUF values, garbled circuits may be used to authenticate one or more devices. Garbled circuits are a cryptographic technique that allows for two or more parties to securely compute a function. A device and an authentication device may use a garbled circuit to compute the distance between new PUF values and stored, enrolled PUF values. The authentication device may store random values that are inputs to the garbled circuit and correspond to the enrollment values, without actually storing the enrollment values, and an adversary may gain no PUF value information if the authentication device were compromised. Therefore, to authenticate a device using a remote computing device and address the potential for stored PUF values to be compromised, a remote computing device may perform the acts of: generating parameters of a garbled circuit, the parameters comprising first input keys and second input keys, and transmitting, to the device, via at least one network, the first input keys and the second input keys, wherein the first input keys are encrypted. The device may perform the acts of: receiving, from the remote computing device, the first input keys and second input keys, obtaining a physically unclonable function value comprising a plurality of bits representing a digitized value of a signal generated by a PUF circuitry coupled to the device, generating a device encryption key using the PUF value, decrypting at least some of the first input keys using the device encryption key to obtain decrypted keys, evaluating the garbled circuit using the decrypted keys and the second input keys to obtain a garbled circuit output value, and transmitting, via the at least one network, the garbled circuit output value to the remote computing device for authenticating the device. The remote computing device may perform the acts of receiving, from the device, the output value of the garbled circuit and authenticating the device based on the output value of the garbled circuit.

Some embodiments of the technology described herein address some of the above-discussed drawbacks of conventional technology for generating PUFs and authenticating devices using PUFs. However, not every embodiment need address every one of these drawbacks or the improvements discussed above, and some embodiments may not address any of the drawbacks. As such, it should be appreciated that aspects of the technology described herein are not limited to addressing all or any of the above discussed drawbacks of conventional PUF authentication systems.

FIG. 1 shows an illustrative block diagram of a system 100a, including a device 102a and an authentication device 104a, in which some of the technology described herein may operate, in accordance with some embodiments. FIG. 1 illustrates the device 102a, the authentication device 104a, authentication database 107a, and network 109a. The device 102a includes PUF circuit(s) 101a and sensor(s) 103. The network 109a connects the device 102a to the authentication device 104a, which has access to the authentication database 107a. The system 100a may be operable to securely authenticate the device 102a. The device 102 may be configured to obtain one or more PUF values and perform suitable cryptographic operations in order to be authenticated by the authentication device 104, in accordance with the systems and methods described herein.

In the illustrated embodiment, the device 102a may be any suitable mobile or stationary computing device that is to be securely authenticated. The device 102a may include any suitable processing circuitry (e.g., a microprocessor, field programmable gate array (FPGA), application specific integrated circuit (ASIC)) for carrying out the techniques and methods described herein. In some embodiments, the device 102a includes any suitable network interface(s) for communicating with the authentication device 104, which may be at a local or remote proximity to the device 102. In some embodiments, the device 102a may be one of several devices configured to be authenticated by the authentication device 104a.

The sensor(s) 103 may be any suitable sensors configured to collect data. In some embodiments, the sensors include position sensors (e.g., a global positioning system receiver among other position sensors), environmental sensors (e.g., temperature sensors among other environmental sensors), medical sensors (e.g., electrocardiogram, pulse oximetry, among other sensors), and/or any other suitable sensors. In some embodiments, the sensor(s) 103 may be suitable transducers. In some embodiments, the device 102*a* may need to be authenticated for data collected by the sensor(s) 103 to be shared. In some embodiments, the data collected by the sensor(s) 103 is encrypted using PUF values from the PUF circuit(s) 101*a*. In some embodiments, the sensor(s) 103 may be actuators that require secure authentication to be activated. In some embodiments, the sensor(s) 103 may be reprogrammed once the device 102*a* is authenticated. In some embodiments, the device 102*a* omits sensor(s) 103 and the device is authenticated, for example, to establish a secure communication channel among other suitable reasons.

The device 102 may use the PUF circuit(s) 101*a* to generate one or more PUF values that represent digitized values of one or more signals generated by the PUF circuit(s) 101*a*. The PUF circuit(s) 101*a* may be integral with device. For example, the PUF circuits may be on the same die as processing circuitry in the device, in a same package as the device, physically connected to the device, and/or otherwise in electrical communication with the device 101*a*. The PUF circuit(s) 101*a* may implement any suitable PUF to generate the signals, which may be analog signals. For example, the PUF circuit(s) 101*a* may generate analog signals such as a voltage mismatch, resistance capacitance product mismatches, transistor threshold voltage mismatch, transistor transconductance mismatch, and/or any other suitable analog circuit characteristics. The device may be configured not to store PUF values to ensure that the values cannot be taken from a memory by an adversary. Instead, PUF values may be regenerated each time that they are needed.

In some PUF systems, random access memory, ring oscillators, and/or arbiters may be used to quantify an analog characteristic of a circuit, for example by generating a single bit from a voltage mismatch. But, these coarsely quantized PUF systems lose information in the quantization process and may therefore be sensitive to aging of the underlying circuitry, thus requiring error correcting codes. The PUF circuit(s) 101 are operable to preserve a substantial amount of the analog information, and the system 100*a*, along with other systems and methods described herein, may be used to authenticate the device 102*a* without using an error correcting code on the PUF values. Error correcting codes may be prohibitively costly to implement in some devices.

Figure 2:
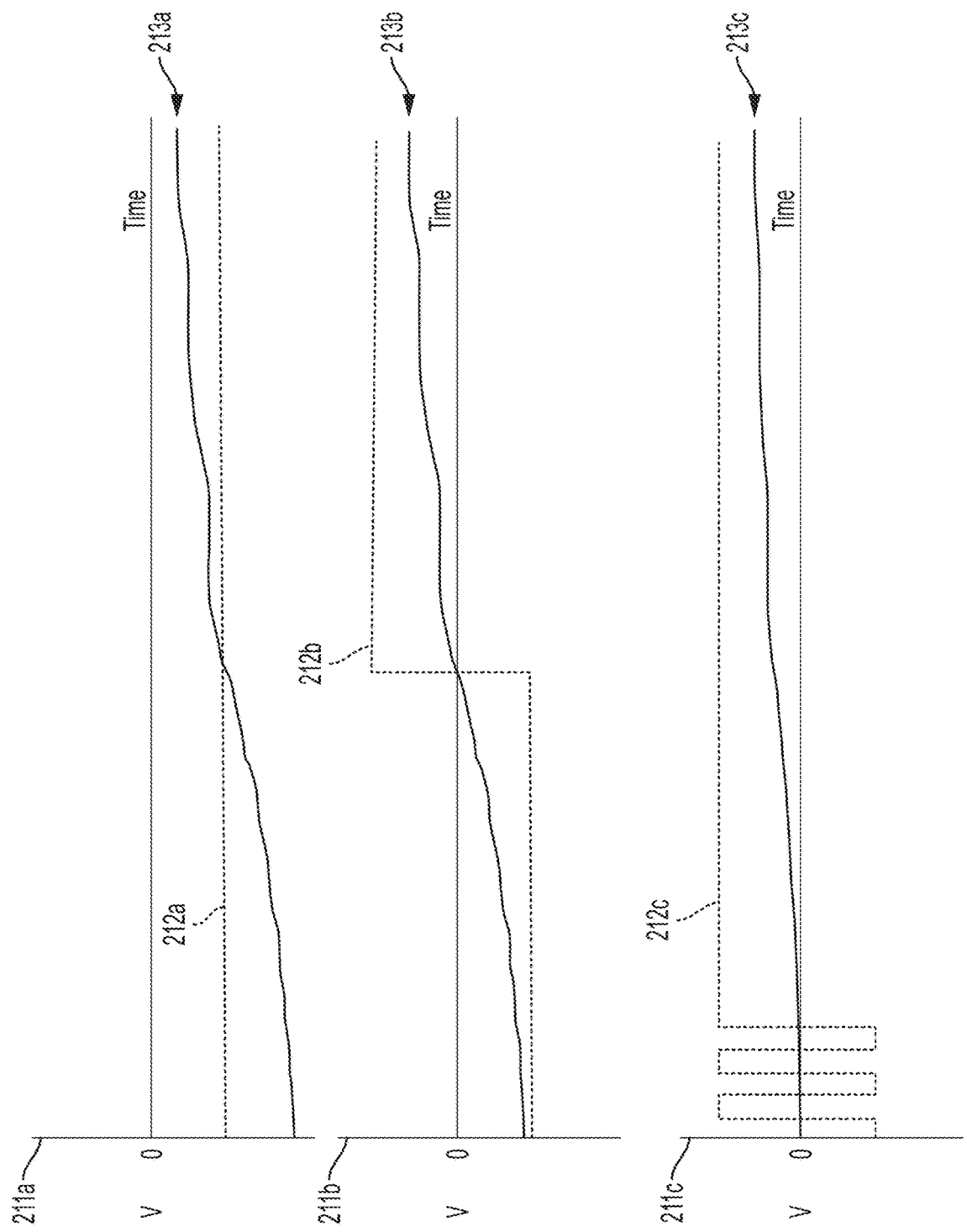
FIG. 2 shows an illustrative diagram of the output value of a PUF circuit used to generate a PUF value over time, in accordance with some embodiments.

FIG. 2 shows an illustrative diagram of the output of a PUF circuit (e.g., 101*a*) used to generate a PUF value over time, in accordance with some embodiments. FIG. 2 shows graphs 211*a-c*, which each display analog voltage signals 213*a-c* and binary voltage signals 212*a-c* as functions of time. The analog voltage signals 212*a-c* drift as a function of time and aging of respective, generative PUF circuitry (e.g., 101*a*). The binary voltage signals 212*a-c* may correspond to the outputs of conventional binary PUF circuits.

PUF circuits may be referred to as having various levels of strength, which refers to a resilience against quantization errors, such as from environmental factors, aging, or any other source of errors. The graph 211*a* corresponds to a 'strong' PUF circuit. Graphs 211*b* corresponds to a 'weak' PUF circuit. Graphs 211*c* corresponds to a 'very weak' PUF circuit.

The graph 211*a* corresponds to a strong PUF circuit because the initial voltage measurement is far from the center of the measurement range and quantization errors due to aging effects are therefore unlikely. The graph 211*a* shows that over time, the initial distance is sufficient such that, over time, the analog voltage signal 213*a* does not drift far enough from aging to change the binary voltage signal 212*a*.

The graph 211*b* corresponds to a weak PUF circuit because the initial voltage measurement is relatively close to the center of the measurement range and the binary value is likely to flip due to aging. The graph 211*b* shows that over time, the initial value of the analog voltage signal 213*b* is sufficient such that the binary voltage signal 212*a* does not flip from the initial value or a period of time. However, at the expiry of this period of time, the PUF value may need to be re-enrolled, error corrected, or the useful life of the device may be limited, since the binary voltage signal 212*b* will no longer correspond to earlier binary values used to enroll or authenticate the device.

The graph 211*c* corresponds to a very weak PUF circuit because the analog voltage signal 213*c* is initially very near to the threshold for generating the binary voltage signal 212*c*. Consequently the binary voltage signal 212*c* oscillates between zero and one, therefore exhibiting a high error rate, since small errors or sources of noise may change the reading of the analog voltage signal 213*c* from one side of the threshold to another. The weak PUF circuit ages to become stronger, but may be initially unreliable and the initial value may not match the value after aging.

The PUF circuitry of FIG. 1 may use an analog-to-digital converter with sufficient resolution to create digital readings that are substantially closer to the analog voltage signals of FIG. 2 than the 1-bit quantized voltage values. For example, the device and PUF circuits may use an ADC with 2, 4, 8, 12, 16, or more bits. Therefore, the ADC may provide 256 or more digital voltage levels between the zero and one levels shown by the binary voltage signals of FIG. 2. However, fine grain measurements may be sensitive to the problem of PUF circuit aging, since fine measurements will track the time variation more closely than the binary signals.

FIG. 3 shows an illustrative diagram of PUF values that were measured or enrolled by an authentication device, in accordance with some embodiments. FIG. 3 shows PUF value ranges 315*a-n*, and respective enrollment values 317*a-n* and obtained values 319*a-n*. PUF value ranges 315*a-n* each correspond to a respective PUF circuit. For example, a device (e.g., 102*a&b*) may be authenticated on the basis of n values generated by n PUF circuits (e.g., 101*a&b*). In order to authenticate the device, an authentication device (e.g., 104*a&b*) may match obtained PUF values 319*a-n* to enrollment values 317*a-n* that were stored and attributed to the device during an enrollment process. Due to the nature of a PUF, a device may be authenticated if said device can reproduce enrolled PUF values, which should not be clonable by an imposter device. However, due to aging and other sources of noise and error, the enrollment values 317*a-n* are unlikely to perfectly match the obtained values 319*a-n*, even for an authorized device. The systems and methods described herein may obtain PUF values digitized with high resolution and compensate for PUF value mismatches without the use of error correcting codes according to multiple protocols carried out by the device (e.g., 102*a&b*) to be authenticated and the authentication device (e.g., 104*a&b*).

Returning to FIG. 1A, the authentication device 104*a* is used to authenticate the device 102*a*. For example, the authentication device 104*a* may be configured to prevent an adversary from gaining information by replaying or spoofing messages from the device, mounting man-in-the-middle attacks, or otherwise imitating the device 102*a* and/or eavesdropping. In some embodiments, an adversary that gains complete control of the authentication device 104*a* may be unable to gain any secret information needed to authenticate the device 102a. In some embodiments, the authentication device 104a and the device 102a may employ encryption based on the PUF circuit(s) 101a with each device carrying out portions of encryption protocols described throughout the present disclosure.

Authenticating the device 102a may include determining that the device corresponds to enrollment PUF values, providing the device 102a with access to information/data, authorizing receiving data/information from the device 102a, and/or determining that the device 102a is a valid member of a set of devices (e.g. from a certain manufacturer or sensor network implementation). Authenticating the device 102a may also include determining that the device 102a has not been tampered with and has remained physically secure, since attempts to tamper with the device 102a and/or the PUF circuit(s) 101a may alter or destroy the PUF values used to authenticate the device 102a. Authenticating the device 102a may include outputting a signal indicating whether the device has been authenticated as a valid device. The authentication signal may be provided to any one or more additional devices.

To authenticate a device, the authentication device 104a may retrieve stored enrollment PUF values that were obtained from the device 102a during an enrollment process. The purpose of an enrollment process is to record the PUF values generated by the PUF circuits 101a so that future PUF values can be compared to the enrolled values. In some embodiments, the authentication device 104a does not store any PUF values directly and may store information related to the enrollment values. In some embodiments, the stored information does not reveal any information about the enrollment values, for example input keys for a garbled circuit authentication scheme may be stored in lieu of the enrollment PUF values. In some embodiments, the enrollment values may be matched by computing encryption keys separately at the device 102a using new PUF values and at the authentication device 104a using enrollment PUF values, and messages may only be successfully decrypted when the separately computed keys match.

As discussed with reference to FIGS. 2&3, matching PUF values may be sensitive to noise, device aging, and other factors. In some embodiments, the authentication device 104a computes a distance between one or more PUF values obtained from the device 102a and corresponding enrollment PUF values. For example, the device 102a may generate and/or transmit PUF values from the PUF circuits 101a in a predetermined or variable order that is known to the authentication device 102a, such that the authentication device 104a may match each PUF circuit 101a to the enrollment value recorded for the same circuit. The authentication device 104a may measure a Euclidean distance, a Hamming distance, or any other suitable distance between the PUF values. In some embodiments, the authentication device 104a sums the distances computed for all of the PUF values. A person of ordinary skill in the art should appreciate that multiple methods of determining the distance(s) between value(s) may be used without departing from the scope of the present disclosure.

The enrollment PUF values may be retrieved by the authentication device 104A from the authentication database 107a. The authentication database 107a may store any suitable information for authentication the device 102a. For example, the authentication database 107a may store enrollment PUF values, encryption keys, a device identifier, authentication parameters, and/or any other suitable information. In some embodiments, the information is stored in a cryptographically secure manner such that an adversary cannot gain information from the contents of the authentication database 107a. In some embodiments, such as involving a limited number of local devices, the authentication device 107a may store the enrollment values and other information in an unencrypted format.

Computing a distance between measured and enrolled PUF values may compensate for aging of the PUF circuits, which leads to mismatches, without the need for error correction. The authentication device 104a may compare the distance to a threshold and authenticate the device 102a if the distance does not exceed the threshold. The authentication device may use any threshold and number of PUF values necessary to uniquely identify the device 102a.

In some embodiments, the authentication device 104a may use one or more additional thresholds for authenticating the device and determining whether to make adjustments to compensate for PUF circuit aging. For example, the authentication device 104a may use a second threshold, indicating a lower distance than the first threshold, and adjust the stored enrollment values to be closer to the obtained PUF values when the computed distance exceeds the second threshold but not the first. This marginal matching may indicate that the device 102a is to be authenticated but that PUF circuit aging is decreasing the reliability of the match. In some embodiments, the authentication may implement aging tracking to generate a distance adjustment value that is combined (e.g., added to, subtracted from, or multiplied with) the computed distance prior to the threshold comparison. In some embodiments, authentication device 104a may use the aging tracking may make incremental adjustments to the stored enrollment values, such that the effect of slow aging can be mitigated.

The authentication device 104a is connected to the device 102a by the network 109a. The network 109a may be any suitable wired or wireless network. For example, the network 109a may be a wide area network including the internet (e.g., a virtual private network, overlay network, and/or internet traffic flows) with connections implemented via. 802.11 Wi-Fi, Ethernet, fiber-optics, or any suitable connection. In some embodiments, the network 109a may be an ad-hoc network using any suitable connection. In further embodiments, the network 109a may be a wired or wireless local network. In some embodiments, the local network 109a may include Bluetooth, near field communication, RFID, other passive sensor communication technology, or any other suitable local area communication. In some embodiments, the local network 109a may include wired connections, including Universal Serial Bus (USB), Inter-Integrated Circuit (I2C), Serial Peripheral Interface (SPI), network-on-chip (NOC), Peripheral Component Interconnect Express (PCIe), or any other suitable connection.

It should be appreciated, and the inventors have recognized, that various topologies of the network 109a may be better suited for various authentication methods that may be practiced according to the present disclosure.

For example, in some embodiments, the network 109a may be a local area network. In such embodiments, the authentication database 107a may store PUF values from the device 102a in plain text or with limited encryption, such that an adversary compromising the authentication database 107a and/or the authentication device 104a may be able to gain information about a local deployment of devices. Local area deployments of devices may trade, for example, simplicity in the implementation for the possibility of the limited number of device being potentially compromised.

In some embodiments, for example where the network 109*a* is a local area network, the device 102*a* and the authentication device 104*a* may employ several methods for generating encryption keys for secure authentication. In some embodiments, the device 102*a* may store a fixed key in memory (e.g., one-time programmable memory) on the device 102*a* that is also shared with the authentication device 104*a* and stored in the authentication database 107*a*. The shared, fixed key may be unique for each device and used to encrypt communications between the devices, generate suitable cryptographic proofs, or in any suitable manner. A shared secret key, however, may be discoverable by an adversary that physically inspects the device, for example by de-capping or visually inspecting a one-time programmable memory.

In some embodiments, the device 102*a* and the authentication device 104*a* may generate one or more encryption keys based on the PUF values generated by the PUF circuit(s) 101*a*. During an enrollment process, the device 102*a* may generate one or more PUF values using the PUF circuit(s) 101*a* and transmit the PUF values to the authentication device 104*a*. In further embodiments, the authentication device 104*a* may compute the amplitude (e.g., an absolute value, or a distance from the median of the range of possible values) of the PUF values. The amplitudes of the PUF values may be used to determine a high offset pool of PUF values with amplitudes that exceed a threshold. The authentication device may track the PUF values and corresponding PUF circuits in the high offset pool by storing pointers to memory, maintaining a database or key value schema, or any suitable method.

In some embodiments, the device 102*a* may store a corresponding high offset pool in memory on the device. The device 102*a* may store indications of the PUF circuits that generate high offset PUF values (e.g., PUF values with amplitudes that exceed the threshold used to determine the pool) rather than storing any unencrypted PUF values. This storage configuration allows for the device 102*a* to create common PUF circuit references with the authentication device 107*a* by leveraging the security of using the PUF circuits and eliminating the vulnerability of physical memory. Furthermore, the inventors have recognized that the high offset pool of PUF circuits may be robust to aging, noise, and other errors and be utilized to generate PUF values reliably. In some embodiments, the PUF circuits included in the high offset pool may be changed, for example if aging moves one or more PUF circuits across the amplitude threshold.

In some embodiments, a high offset pool of PUF values/circuits is accessed in a predetermined order. The order may be determined by the device 102*a* and/or the authentication device 104*a* during the enrollment process. In some embodiments, the PUF circuit(s) are linearly addressable and accessed in increasing/decreasing order of the address space. The order may be determined in any suitable manner, and, if the order is known to the device 102*a* and the authentication device 104*a*, should yield identical keys generated separately at both devices. In some embodiments, the separately generated keys may correspond without necessarily being identical. For example, the keys may be part of a key pair and/or one key may be the inverse of the other when applied in an obfuscation protocol.

Since the high offset pool can be expected to be largely robust to noise and aging, and include PUF values with large amplitudes, it is unlikely that the most significant bits and/or sign bits of the PUF values will change. These bits that are unlikely to change between readings may be referred to as stable bits. Therefore, the authentication device may use stable PUF value bits from enrollment PUF values to independently generate an encryption key that is identical to a key generated on the device 102*a* from corresponding stable PUF value bits. For example, the device 102*a* and the authentication device 104*a* may each concatenate the sign bits (or most significant bit) of the PUF values in the high offset pool to generate a key with a length equal to the number of PUF values in the high offset pool.

In some embodiments, the device 102*a* and the authentications device 104*a* may generate multiple encryption keys. For example, the multiple encryption keys may be generated at random, according to a stream cipher protocol, or in any suitable manner. Multiple keys may be generated from a single high offset pool of PUF values by selecting different collections and/or permutations of pointers into the high offset pool. The authentication device 104*a* may select the pointers into the high offset pool and transmit the pointers to the device 102*a*. Since the pointers do not reveal information about the PUF values, the pointers may be transmitted in the clear to the device 102*a*. The device 102*a* and the authentication device 104*a* may then use the pointers to generate encryption keys in a similar manner as when the order of accessing the PUF values was predetermined.

The inventors have also appreciated that, in some embodiments, the network 109*a* may be a wide area network that is configured to connect an authentication device 104*a* and authentication database 107*a* to a global collection of devices 102*a*. In such embodiments, it may be necessary to ensure that the authentication device 104*a* and authentication database 107*a* cannot reveal any information (e.g., when compromised by an adversary) and thereby compromise the global collection of devices. In some embodiments, the authentication device 104*a* and the device 102*a* may perform authentication using a garbled circuit protocol.

A garbled circuit refers to techniques for secure multiparty computation. It should be apparent to a person of ordinary skill in the art that a garbled circuit may be implemented according to the garbled circuit protocol credited to Andrew Yao. In some implementations, two parties or more may evaluate a garbled circuit without any party being able to discern any information about the inputs of any other party. For simplicity, the garbled circuits described herein will involve two parties (e.g., the device 102*a* and the authentication device 107*a*) but it should be appreciated that multiparty garbled circuits may be implemented.

In some embodiments, a garbled circuit includes one or more logic gates, which are based on corresponding truth tables, one party acting as a constructor, and one party acting as an evaluator. The constructor constructs the garbled circuit. For each logic gate in the garbled circuit, the constructor generates a set of parameters. The parameters include input keys that correspond to each possible input for the parties. For example, the constructor may generate four input keys, one for each party to input a zero or one into the gate. The input keys may be randomly generated numbers. The constructor may also assign an output key to each possible output of the logic gate. For example, two labels may be assigned where the possible outputs are zero and one. In some embodiments, each output of a four entry truth table may have a unique output label, but this may require substantially more resources to implement. Pairs of the input keys are then used to encrypt each output that corresponds to inputting the pair of input keys to the gate. For example, the key for party A to input '1' and the key for party B to input '0' would be used to encrypt the output that corresponds to party A inputting '1' and party B inputting '0.'

After the constructor assigns the keys to the inputs and outputs, the rows of the truth table for the logic gate are randomly permuted (or 'garbled') such that the true output value cannot be determined from the row.

The constructor then provides the encrypted outputs for each of the gates in the garbled circuit to the evaluator. In order to decrypt the outputs and evaluate the garbled circuit, the evaluator will need to receive the input keys from the constructor. The constructor may send the keys corresponding to the constructor's input to the evaluator. The evaluator is ignorant of the mapping between keys and true inputs and, thus, receives no information about the constructor's input. In order to completely evaluate the garbled circuit, the evaluator must receive the proper keys for the evaluator inputs. This creates the potential for the constructor to learn the evaluator's input, which can compromise the authentication process. For example, if the authentication device 104$a$ were, while acting as the constructor, able to observe the input of the device 102$a$, acting as the evaluator, then an adversary could compromise the authentication device 104$a$ in order to learn the PUF values for every device being authenticated with a garbled circuit.

In some embodiments, the evaluator input keys are transferred according to an oblivious transfer protocol. Oblivious transfers allow a first party to receive one piece of information out of many possible options held by a second party. The transfers are oblivious because the second party does not learn the first party's chosen input and the first party does not learn the other possible options not transferred. For example, the evaluator may receive the input key corresponding to zero without learning what random number was assigned as an input key for one. If the evaluator received both valid input keys, it may be possible to determine the inputs from the constructor.

In some embodiments, the garbled circuit may be modified to allow for the evaluator (e.g. the device 102$a$) to receive all valid input keys. In further embodiments, the device input keys may be encrypted by the device 102$a$, during an enrollment period, using one or more PUF values. Therefore, even if receiving all valid input keys would allow the device 102$a$ to determine information about the input of the authentication device 104$a$, the device 102$a$ would only receive PUF value information that was already known to the device 102$a$. An adversary imitating the device would be unable to decrypt any device input key and would therefore be unable to gain information about the server or device inputs. These implementations may have several benefits. For example, this eliminates the need to perform an oblivious transfer, which requires asymmetric encryption that is costly to implement. Furthermore, when the device input labels are stored on the authentication device 104$a$ after being encrypted based on the PUF, it becomes impossible for an adversary to alter the garbled circuit in order to gain information about the PUF values. For example, an adversary could corrupt a garbled circuit in memory to use a truth table with outputs equal to the device inputs, but it would be impossible to compute such a table without knowledge of the unencrypted device input keys needed to create valid encryptions of the outputs.

It should be appreciated that various implementations of the garbled circuit protocol may have respective benefits and costs, for example with respect circuit complexity or hardware design. For example, the asymmetric encryption required for oblivious transfer may not be practicable on certain devices (e.g., edge devices such as low power sensors). Certain methods for evaluating a garbled circuit without asymmetric encryption are provided herein. It should be appreciated that modifications may be made to the garbled circuit protocol without departing from the scope of the disclosure.

Figure 1B:
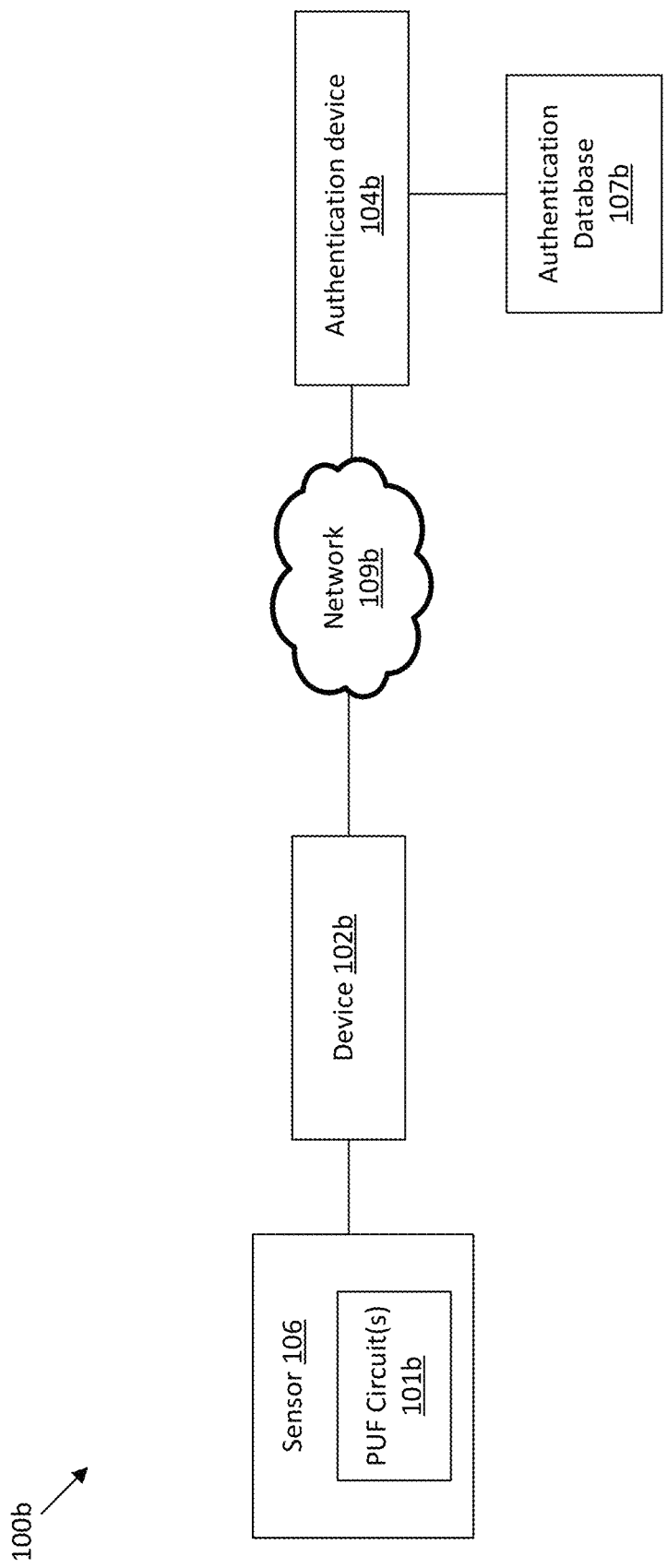
FIG. 1B shows an illustrative block diagram of a system including a device and an authentication device in which some of the technology described herein may operate, in accordance with some embodiments.

FIG. 1B shows an illustrative block diagram of a system 100$b$, including sensor 106, device 102$b$, and authentication device 104$b$, in which some of the technology described herein may operate, in accordance with some embodiments. FIG. 1B includes the sensor 106, the device 102$b$, the network 109$b$, the authentication device 104$b$, and the authentication database 107$b$. The sensor 106 includes PUF circuits 101$b$. The system 100$b$ of FIG. 1B may be operable to authenticate one or more sensors and/or devices.

The sensor 106 may be any suitable sensor. For example, the sensor 106 may include any of the circuitry included in the sensor 103 of FIG. 1A. The sensor 106 may also include any suitable processing or network transmission circuitry. For example the sensor 106 may be passive and powered by power received in a wired or wireless communication interface.

The sensor 106 includes PUF circuit(s) 101$b$. PUF circuit(s) 101$b$ may be any suitable PUF circuits, for example as was discussed with reference to PUF circuits 101$a$ in FIG. 1A. The PUF circuit(s) 101$b$ may be used to identify and/or authenticate the sensor 106. In some embodiments, readings from the sensor 106 are encrypted using PUF values from the PUF circuit(s) 101$b$.

The device 102$b$ may be configured to connect to the sensor 106. The connection may be made using any suitable wired or wireless connection. In some embodiments, the device 102$b$ is configured to forward PUF values from the sensor 106 to the authentication device 104$b$ to authenticate the sensor 106. In some embodiments, the device 102$b$ is configured to authenticate the sensor 106. In further embodiments, the device is configured to connect to multiple sensors. For example, the device 102$b$ may connect to one or more sensors (e.g., 106) through a local area network.

FIGS. 4A-B show illustrative diagrams of PUF circuits 420 and 422, in accordance with some embodiments. The PUF circuit 420 includes transistor 421$a$ and transistor 423$a$ that are electrically connected to output 425$a$. The circuit 420 is configured to generate an analog voltage signal that may be used as a PUF value. In the illustrative embodiment of FIG. 4A, transistor 421$a$ is a PFET, and transistor 423$a$ is an NFET. With the circuit configuration shown, the voltage at the output 425$a$ is equal to the supply voltage minus the difference between the threshold voltages of the transistors 421$a$ and 423$b$. Since the threshold voltages of the transistors 421$a$ and 423$b$ are subject to small, unpredictable variations from the manufacturing process, the voltage at the output cannot be known a priori and is highly likely to be unique to the transistors 421$a$ and 423$b$. The voltage at the output 425$a$ may also include thermal noise that prevents all output values from being identical in practice.

FIG. 4B includes two circuits of the same configuration as FIG. 4A. The PUF circuit 422 includes transistors 421$b$&$c$, transistors 423$b$&$c$, and outputs 425$b$&$c$. Each pair of transistors, the pair 421$b$ and 423$b$ as well as the pair 421$c$ and 4223$c$, may function in the same way as the pair of transistors in FIG. 4A. In some embodiments, each pair of transistors may be used to create a single PUF signal. In some embodiments, both outputs 425$b$&$c$ may be provided to a same analog-to-digital converter as a differential input. In some embodiments, the PUF circuitry may be configured to select pairs of transistors for comparison. It should be appreciated that the illustrative PUF circuits are provided as non-limiting examples and any suitable PUF circuitry may be used.

Figure 5:
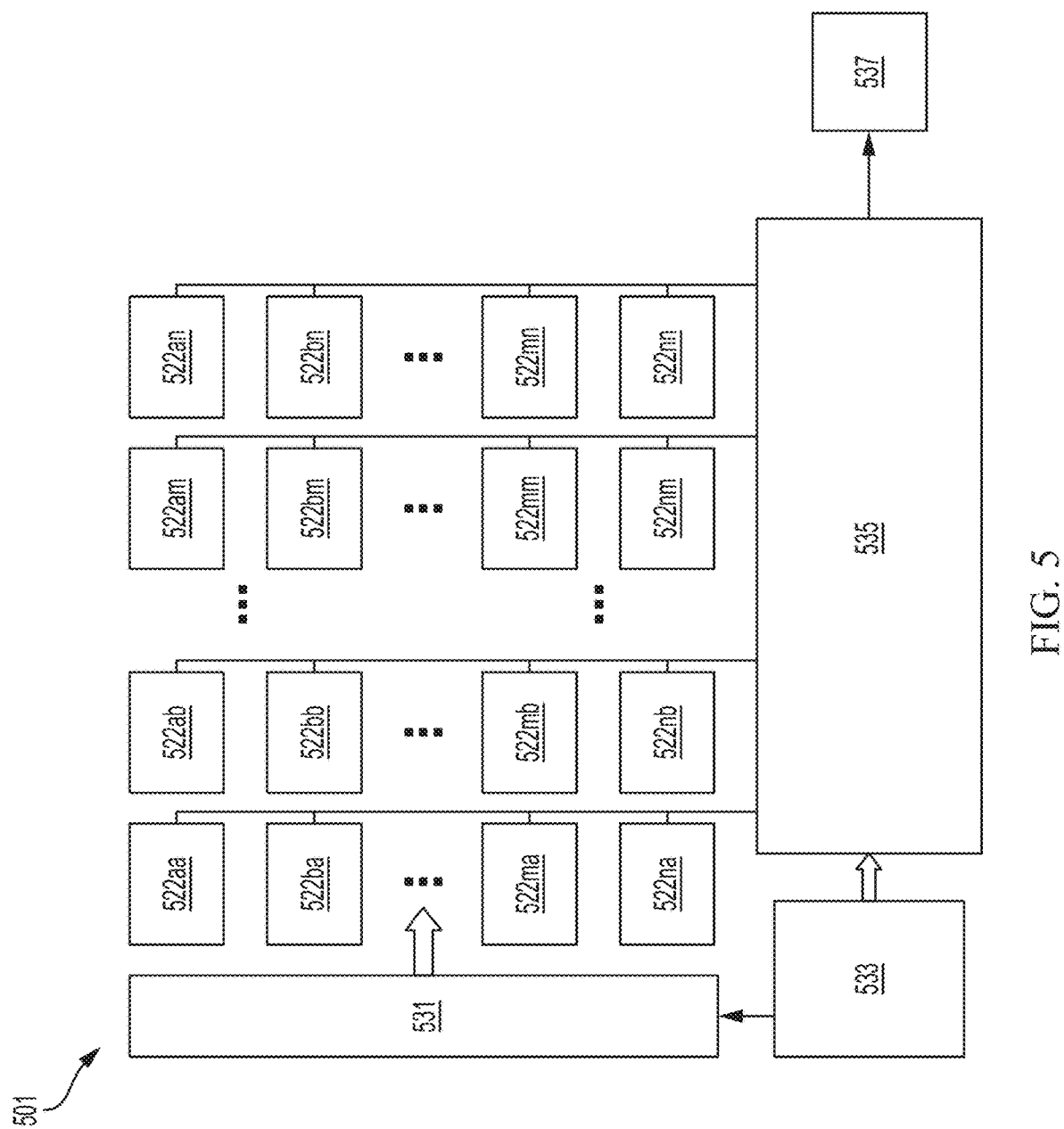
FIG. 5 shows an illustrative block diagrams of an array of PUF circuits, in accordance with some embodiments.

FIG. 5 shows an illustrative block diagrams of an array 501 of PUF circuits 522aa-nn, in accordance with some embodiments. FIG. 5 includes PUF circuits 522aa-nn (note that they are lettered according to matrix notation), decoder 531, timing controller 533, analog multiplexer 535, and analog-to-digital converter 537. The array 501 is operable to generate PUF values (e.g., as was discussed with reference to PUF circuit(s) 101a&b) and may include any suitable PUF circuitry (e.g., PUF circuits 420 and 422).

Figure 4:
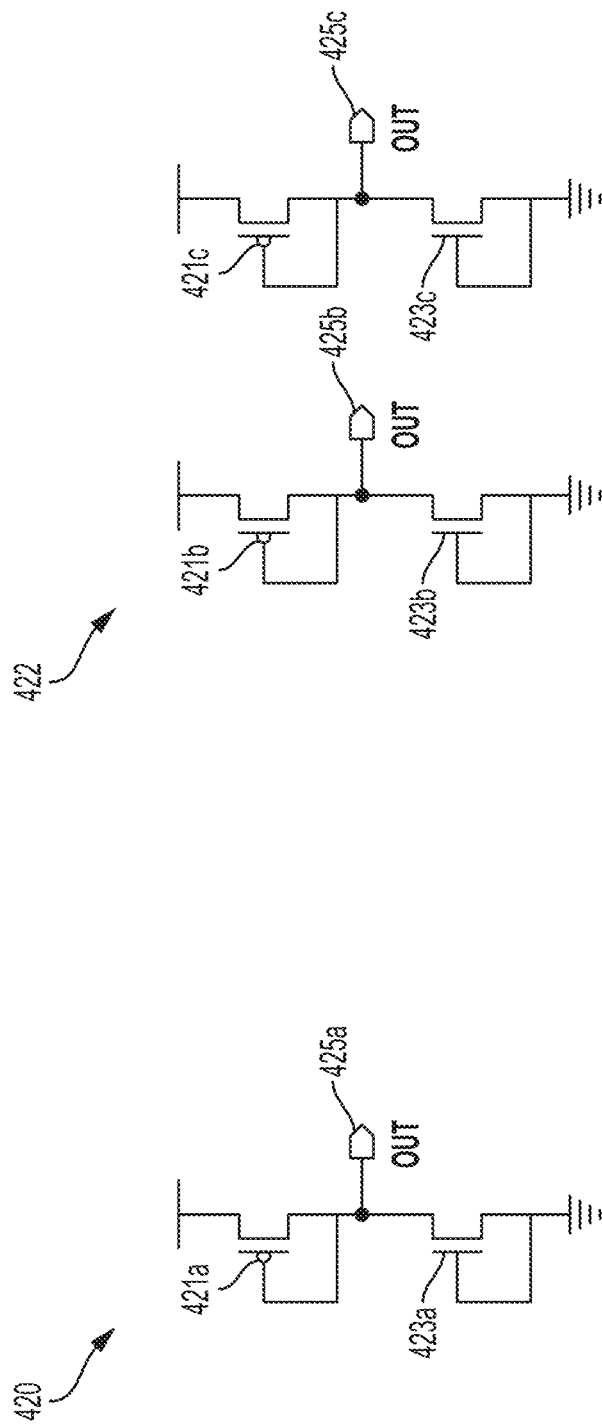
FIGS. 4A-B show illustrative diagrams of PUF circuits, in accordance with some embodiments.

The PUF circuits 522aa-nn may include the PUF circuits discussed with reference to FIG. 4. By arranging multiple PUF circuits 522aa-nn in an array 501, a PUF value may be generated by addressing a particular PUF circuit in the array 501. The decoder 531 is configured to enable selected PUF circuit(s) to output PUF values. The decoder 531 may address the PUF circuits 522aa-nn in any suitable manner. For example the decoder may scan rows and columns and may also allow for individual addressing of the PUF circuits. The PUF circuit addresses may be received at the decoder from any suitable source such as a network interface or an order in memory.

The timing controller 533 is configured to control the decoder 531 and the multiplexer 535. The timing controller may control sequential readings and/or scanning of the PUF circuits 522aa-nn. For example the timing controller 533 may change the multiplexer 535 input at certain intervals and/or enable the multiplexer 535 to ensure that the PUF circuits 522aa-nn generate a valid PUF signal.

The multiplexer 535 passes one analog input signal to the ADC 537, which may be configured for high resolution readings of the analog signals from the PUF circuits 522aa-nn. The resolution may be high enough that quantization error is insubstantial compared to the PUF signal. For example, the device and PUF circuits may use and ADC with 8, 12, 16, or more bits. In some embodiments, the output of the ADC may have a sufficiently high resolution to treat the digital PUF value as an analog signal in the digital domain.

Figure 6:
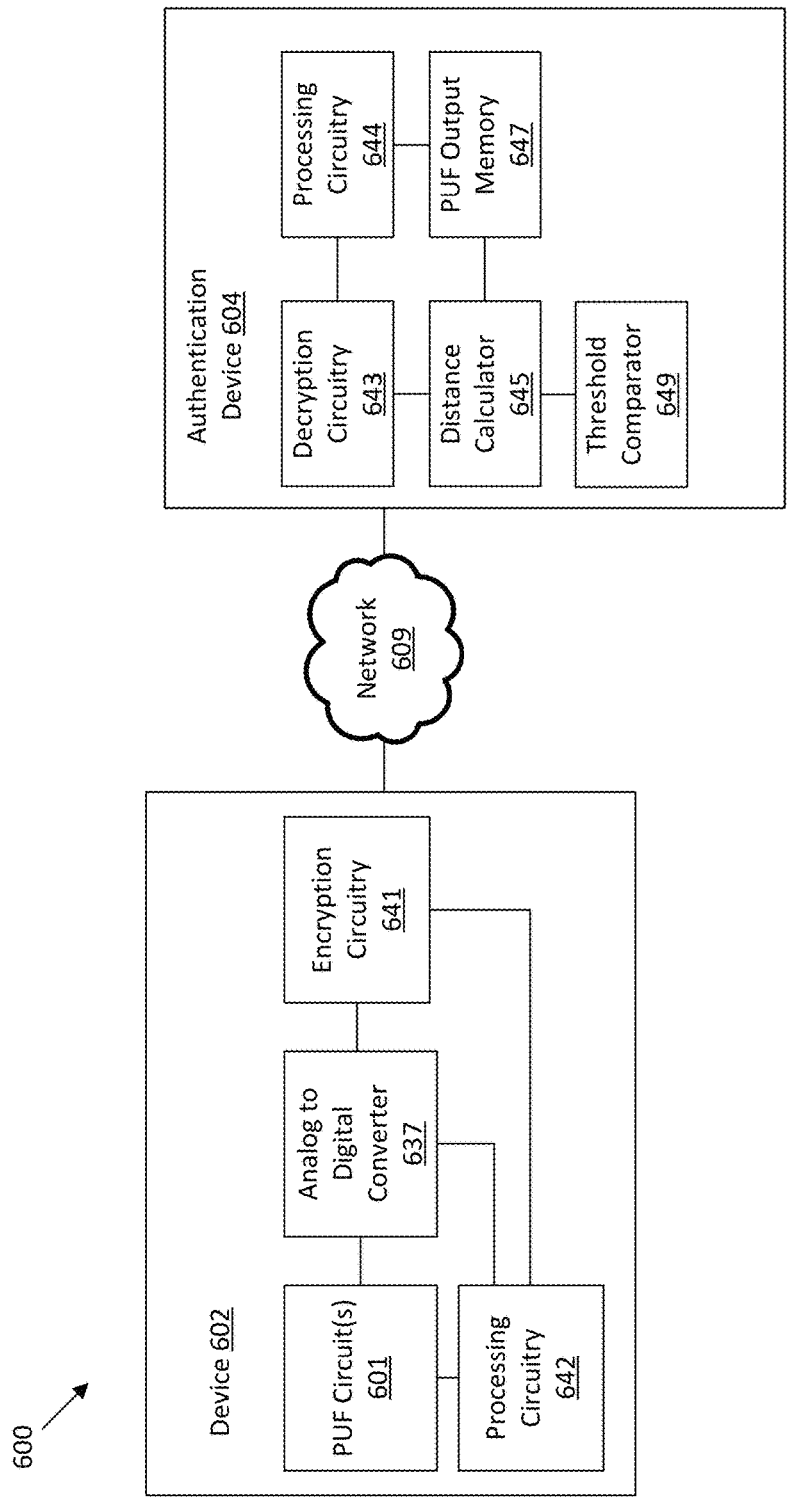
FIG. 6 shows an illustrative block diagram of a device and an authenticator, in accordance with some embodiments.

FIG. 6 shows an illustrative block diagram of a system 600 including a device 602 and an authentication device 604, in accordance with some embodiments. FIG. 6 includes device 602 connected to authentication device 604 by network 609. The device 602 includes PUF includes PUF circuit(s) 601, ADC 637, encryption circuitry 641, and processing circuitry 642. The authentication device 604 includes decryption circuitry 643, processing circuitry 644, distance calculator 645, PUF value memory 647, and threshold comparator 649. The device 602 may be any suitable device, such as device 102a&b, including PUF circuit(s) 601 that may be authenticated by the authentication device 604 according to the methods described herein.

The device 602 includes PUF circuit(s) 601 that generate suitable PUF values. For example, the PUF circuits discussed with reference to FIGS. 4 and 5 may supply adequate PUF values to generate one or more PUF values that represent digitized values of one or more signals generated by the PUF circuit(s) 101A. PUF circuit(s) 601 may be integral with the device 602. For example, the PUF circuit(s) 601 may be on a same die, in a same package, physically connected to, and/or in electrical communication with the device 602. The PUF circuit(s) 101A may implement any suitable PUF to generate the signals, which may be analog signals. For example, the PUF circuit(s) 101A may generate analog signals such as a voltage mismatch, resistance capacitance product mismatches, transistor threshold voltage mismatch, transistor transconductance mismatch, and/or any other suitable analog circuit characteristics.

The ADC 637 digitizes the PUF values. The ADC 637, may be configured for high resolution readings of the analog signals from the PUF circuit(s) 601. The resolution may be high enough that quantization error is insubstantial compared to the PUF signal. For example, the ADC 637 may have a resolution of 8, 12, 16, or more bits. In some embodiments, the output of the ADC 637 may have a sufficiently high resolution to treat the digital PUF value as an analog signal in the digital domain.

It should be appreciated by those skilled in the art that PUF circuits 601 and ADC 637 may be merged into a single circuit. For example, the offset value of an ADC is affected by many device mismatch parameters within the ADC circuit, and conventionally this is considered to be problem rather than a desired effect; but, in the case of a PUF circuit, such behavior can be exploited to produce an ADC that directly produces a digitized PUF output value without requiring an explicit input signal that is derived from an analog circuit. A single ADC can produce many PUF outputs by using a multiplexor to insert devices, from an array of nominally-identical devices, into offset-sensitive circuit areas within the A/D converter, yielding different ADC codes for each selection.

The encryption circuitry may perform any suitable encryption for authenticating the device 602. In some embodiments, the encryption circuitry 641 may generate encryption keys, encrypt and decrypt communications with the authentication device 604, evaluate a garbled circuit, or perform any other suitable computation and/or storage required for encrypting information related to the system 600.

In some embodiments, the encryption circuitry may use a fixed encryption and/or decryption key that is shared with the authentication device 604. The encryption circuitry 641 may store encryption keys in an encrypted form. For example, the encryption circuitry 641 may generate an encryption key based on PUF values and use the generated encryption key to encrypt a symmetric key for communicating with the authentication device 604.

In some embodiments, the encryption circuitry 641 may determine a high offset pool of the PUF circuit(s) 601 and use the high offset pool to generate one or more encryption keys. The encryption circuitry may maintain pointers to the PUF circuits in the high offset pool and obtain the corresponding PUF values from the PUF circuit(s) 601. Portions of the PUF values may be concatenated by the encryption circuitry to form an encryption key.

In some embodiments, the encryption circuitry 641 may be configured to enroll the device 602 in a garbled circuit protocol and evaluate the garbled circuit. For example, during an enrollment process, the device 602 may generate PUF values using the PUF circuit(s) 601, transmit the PUF values to the authentication device 604, receive device input keys for the garbled circuit, encrypt the device input keys based on the PUF values, and send the encrypted PUF values to the authentication device 604. The encryption circuitry 641 may, during an authentication process, receive garbled circuit parameters from the authentication device 604 and evaluate the garbled circuit using PUF values. In some embodiments, the encryption circuitry may also be used to reconfigure and/or re-enroll a garbled circuit.

The processing circuitry 642 may be any suitable processing circuitry such as an FPGA, ASIC, and/or microprocessor. In some embodiments, the processing circuitry 642 may perform and/or control all or portions of the encryption and/or decryption performed on the device 602.

The network 609 may be any suitable local or wide area network. For example, the network 609 may be configured as was discussed with reference to the networks 109a&b.

The authentication device 604 may decrypt communications received via the network 609 from the device 602. In some embodiments, the decryption circuitry 643 may be configured to perform symmetric encryption and decryption. Inn further embodiments, the decryption circuitry 643 may encrypt messages to be sent to the authentication device 604. In order to authenticate the device 602, the authentication device may receive encrypted PUF values from the device 602 and decrypt the PUF values using the decryption circuitry 643.

The decrypted PUF values are provided to the distance calculator 645, which also obtains stored enrollment PUF values corresponding to the device 602 from the PUF value memory 647. The distance calculator may compute any suitable distance metric between received and stored enrollment PUF values. For example, the distance calculator 645 may compute a hamming distance, Euclidean distance, or any suitable measure of distance. The distance calculator 645 may compare multiple PUF values that were each generated by the same PUF circuit at different points in time. The authentication device 604 may be configured to authenticate the device 602 based on each PUF value distance calculation and/or based on the sum of the distances computed for multiple PUF values.

The threshold comparator 649 compares the computed distance(s) to a threshold to determine whether to authenticate the device. The threshold may be configured to be large enough to reliably authenticate the device and small enough to uniquely authenticate the device. Since the threshold allows for some differences between the enrolled and received PUF values, the device can be authenticated without using error corrected PUF values. The threshold may also accommodate differences due to PUF circuit aging, though time variation due to aging may eventually require adjusting one or more values (e.g., the enrollment values, the computed distance, and/or the threshold) used in the authentication process. If the computed distance exceeds the threshold, the device is not authenticated.

Figure 7:
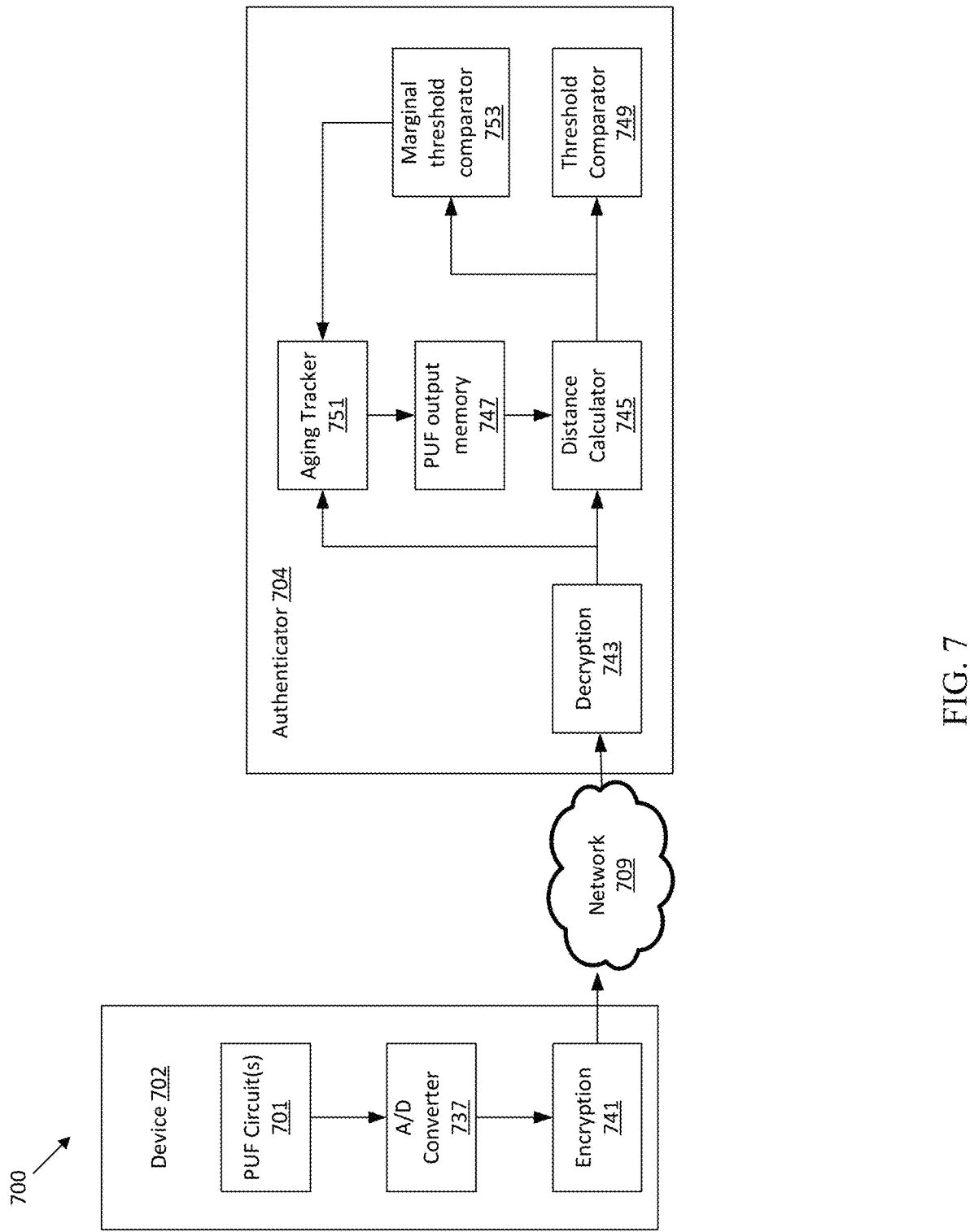
FIG. 7 shows an illustrative block diagram of a device and an authenticator that adjusts enrolled PUF output values, in accordance with some embodiments.

FIG. 7 shows an illustrative block diagram of a system 700 including a device 702 and an authentication device 704 that adjusts enrolled PUF output values, in accordance with some embodiments. The device 702 includes PUF circuit(s) 701, ADC 737, and encryption circuitry 741. The authentication device 704 includes decryption circuitry 743, distance calculator 745, PUF value memory 747, threshold comparator 749, aging tracking circuit 751, and marginal threshold comparator 753. The device 702 may generate PUF values using the PUF circuit(s) 701 and transmit the values of the network 709 to be authenticated by the authentication device 704, which may adjust enrollment values that marginally correspond to the received PUF values.

The device 702 may generate analog signals using the PUF circuit(s) 701 and digitize the signals using the ADC 737. The digitized PUF signals may be encrypted for transmission to the authentication device 704 in accordance with the methods described herein, for example as discussed with reference to FIGS. 1A, 1B, and 6.

In comparison to the authentication device 604, the authentication device 704 additionally includes the aging tracking circuit 751 and the marginal threshold comparator 753. After being decrypted, PUF values received from the device 702 are input to the aging tracking circuit 751. The aging tracking circuit 751 may update the stored enrollment PUF values, stored in the PUF value memory 747, in order to compensate for aging of the PUF circuit(s) 701. In some embodiments, the aging tracking circuit may compute a weighted moving average of the distance and/or enrollment values. For example, new values may be multiplied by a first weight and added to the product of a second weight and the old values. The first and second weights may sum to one.

In some embodiments, the aging update takes place when the distance computed by the distance calculator 745 exceeds a marginal threshold that is smaller than the threshold used by the threshold comparator 749 to authenticate the device 702. The marginal threshold comparator determines whether the computed distance is low enough to authenticate the device but higher than the marginal threshold, indicating that recalibration may be needed to prevent aging from degrading the PUF value matching. The marginal threshold may indicate a substantial portion of the distance of the first threshold, for example one half or two thirds or three quarters of the full distance. In some embodiments, the aging tracker updates the enrolled PUF values only when the marginal threshold is exceeded by an authenticated distance. In some embodiments, the elements of the authentication device may need to operate on unencrypted data to be able to perform the operations to adjust the stored enrolled PUF values.

Figure 8:
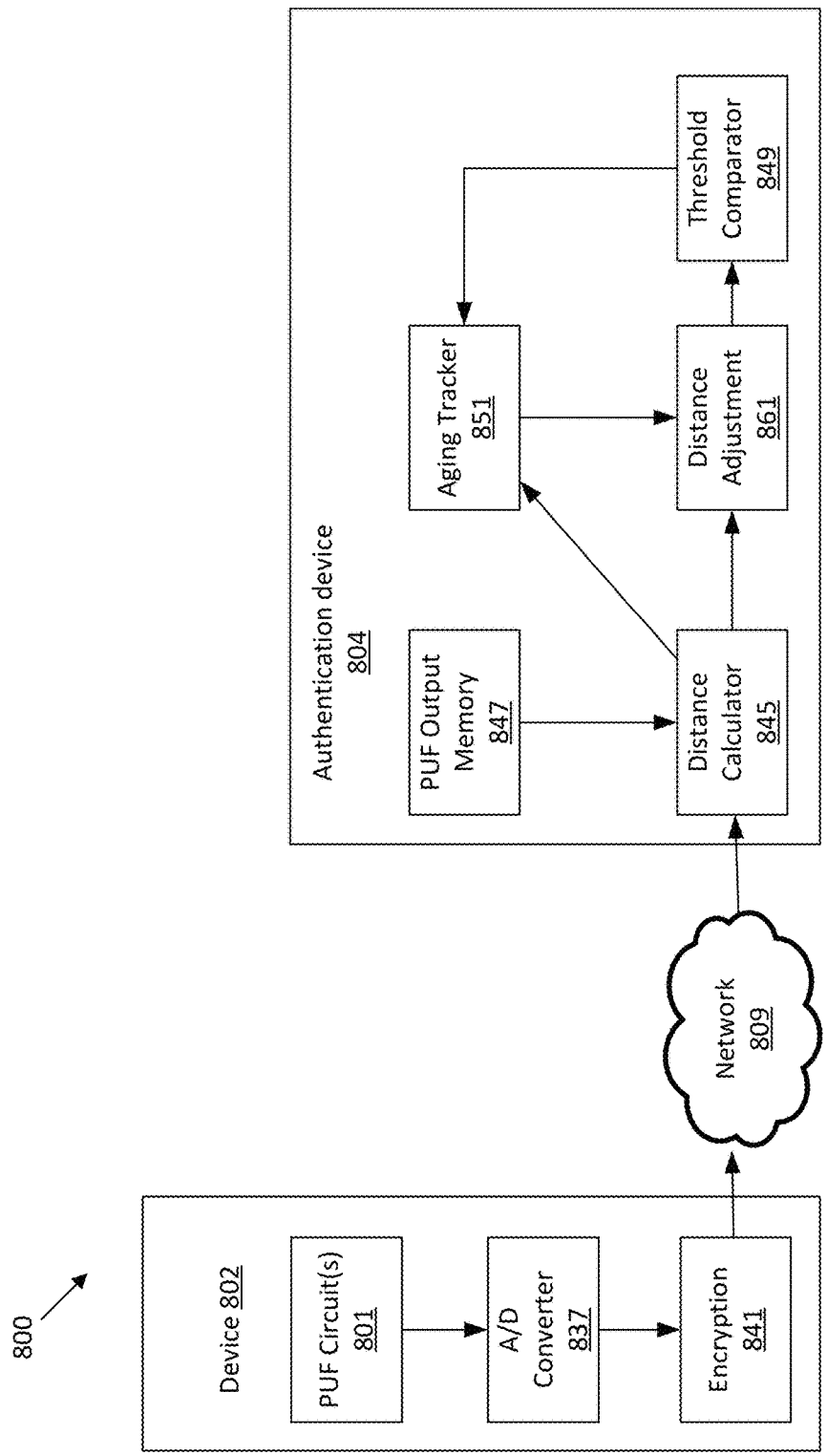
FIG. 8 shows an illustrative block diagram of a device and an authenticator that adjusts enrolled PUF output values, in accordance with some embodiments.

FIG. 8 shows an illustrative block diagram of a system 800 including a device 802 and an authentication device 804 that adjusts enrolled PUF output values, in accordance with some embodiments. The device 802 includes PUF circuit(s) 801, ADC 837, and encryption circuitry 841. The authentication device 804 includes distance calculator 845, PUF value memory 847, threshold comparator 849, and aging tracking circuit 851. The device 802 may generate PUF values using the PUF circuit(s) 801 and use the PUF values to be authenticated by the authentication device 804, which may adjust enrollment values that marginally correspond to the received PUF values. The system 800 may use a garbled circuit to authenticate the device 802.

The device 802 may generate analog signals using the PUF circuit(s) 801 and digitize the signals using the ADC 837. The digitized PUF signals may be encrypted for transmission to the authentication device 804 by the encryption circuitry 841 in accordance with the methods described herein, for example as discussed with reference to FIGS. 1A, 1B, and 6.

In some embodiments, the authentication device may decrypt received PUF values and use the distance calculator 845 to compute a distance between the received PUF values and enrollment PUF values stored in the PUF value memory 847. The computed distance may be provided to the aging tracking circuit 851, which may track time variations of the computed distance and produce an indication of the aging of the PUF circuit(s) 801. The aging tracking circuit 851 and/or distance adjustment circuit 861 may produce a distance adjustment value based on the indication of the aging of the PUF circuit(s) 801. The computed distance and the distance adjustment value are used by the distance adjustment circuit 861 to adjust the computed distance. For example, the distance adjustment circuit may add a percentage of the threshold to the computed distance. In some embodiments, the aging tracking circuit 851 may compute a weighted moving average of the received PUF values. The aging tracking circuit 851 and the distance adjustment circuit 861 may then compute an adjusted distance based on the weighted moving average. The adjusted computed distance is input to the threshold comparator 849 to authenticate the device when the adjusted distance is less than a threshold.

In some embodiments, functions of the distance calculator 845, the aging tracker circuit 851, the distance adjustment circuit 861, and/or the threshold comparator may be implemented as part of a garbled circuit, which may be stored on the authentication device and evaluated by the device 802. Garbled circuits may be used to compute arbitrary functions and may therefore be used to carry out the computations for authentication without decrypting or directly storing any PUF values in memory. For example, the PUF value memory 847 may store input keys for the server instead of enrolled PUF values.

Figure 9:
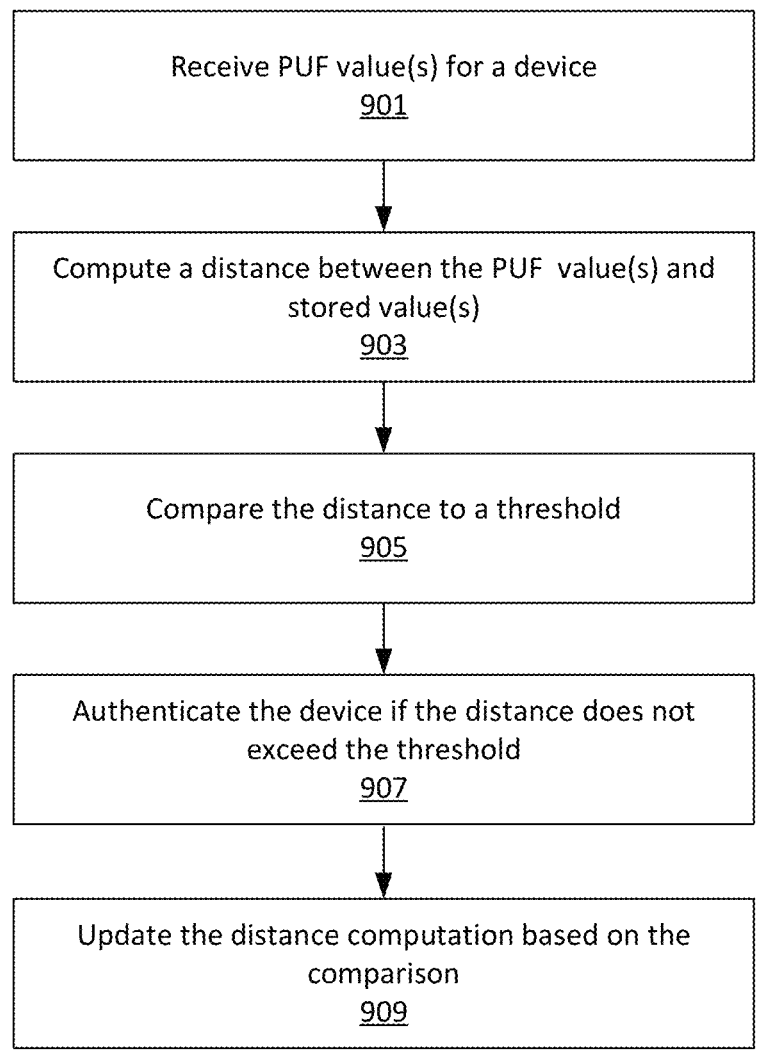
FIG. 9 shows an illustrative process flow for authenticating a device using PUF values, in accordance with some embodiments.

FIG. 9 shows an illustrative process flow 900 for authenticating a device using PUF values, in accordance with some embodiments. FIG. 9 illustrates a process flow that may be executed using an authentication device (e.g., authentication devices 104a&B, 604, 704, and/or 804) connected to a device (e.g., devices 102a&b, 602, 702, and/or 802) operable to obtain PUF values (e.g., from PUF circuits 101a&b, 601, 701, and/or 801).

The process flow 900 begins at act 901, where, in some embodiments, PUF values are received for a device. The PUF values may be transmitted directly from a device or through one or more proxy devices. For example, a single device may receive PUF values for one or more edge devices and forward the PUF values to a same authentication device. The PUF values may be generated by any suitable PUF circuitry. In some embodiments, the PUF values represent digital samples of an analog signal generated by a PUF circuit.

At act 903, the authentication device computes a distance between the received PUF values and stored PUF values. The stored PUF values may be retrieved from any suitable memory. In some embodiments, the stored PUF values are received, directly or indirectly, from the same device being authenticated during an enrollment process. The authentication device may compute any suitable distance metric between the received and stored PUF values, including Hamming and/or Euclidean distance.

At act 905, the authentication device compares the computed distance to a threshold. Comparing the distance to a threshold allows for the use of PUF values that have not been error corrected, as small discrepancies should not exceed the threshold. However, the threshold may be small enough to uniquely identify the device. Therefore, at act 907, the device is authenticated when the computed distance does not exceed the threshold. If the computed distance exceeds the threshold, the device is not authenticated. The distance may exceed the threshold if a valid device is tampered with. It should be appreciated that receiving multiple PUF values may make it infeasible to imitate the valid device without knowledge of the true PUF values. However, even a valid device may no longer be authenticated if aging of the PUF circuitry causes temporal variation in the PUF values that exceeds the threshold.

At act 909, the authentication device may update the distance computation based on the results of comparing the current distance to the threshold. For example, if the distance is between the threshold and a smaller, marginal threshold, the authentication device may adjust the stored values and/or generate an aging adjustment value to be added to future computed distances. The updating of the distance computation may be performed based on having successfully authenticating the device, and may, in some embodiments, be performed for any or all successful authentications.

Figure 10:
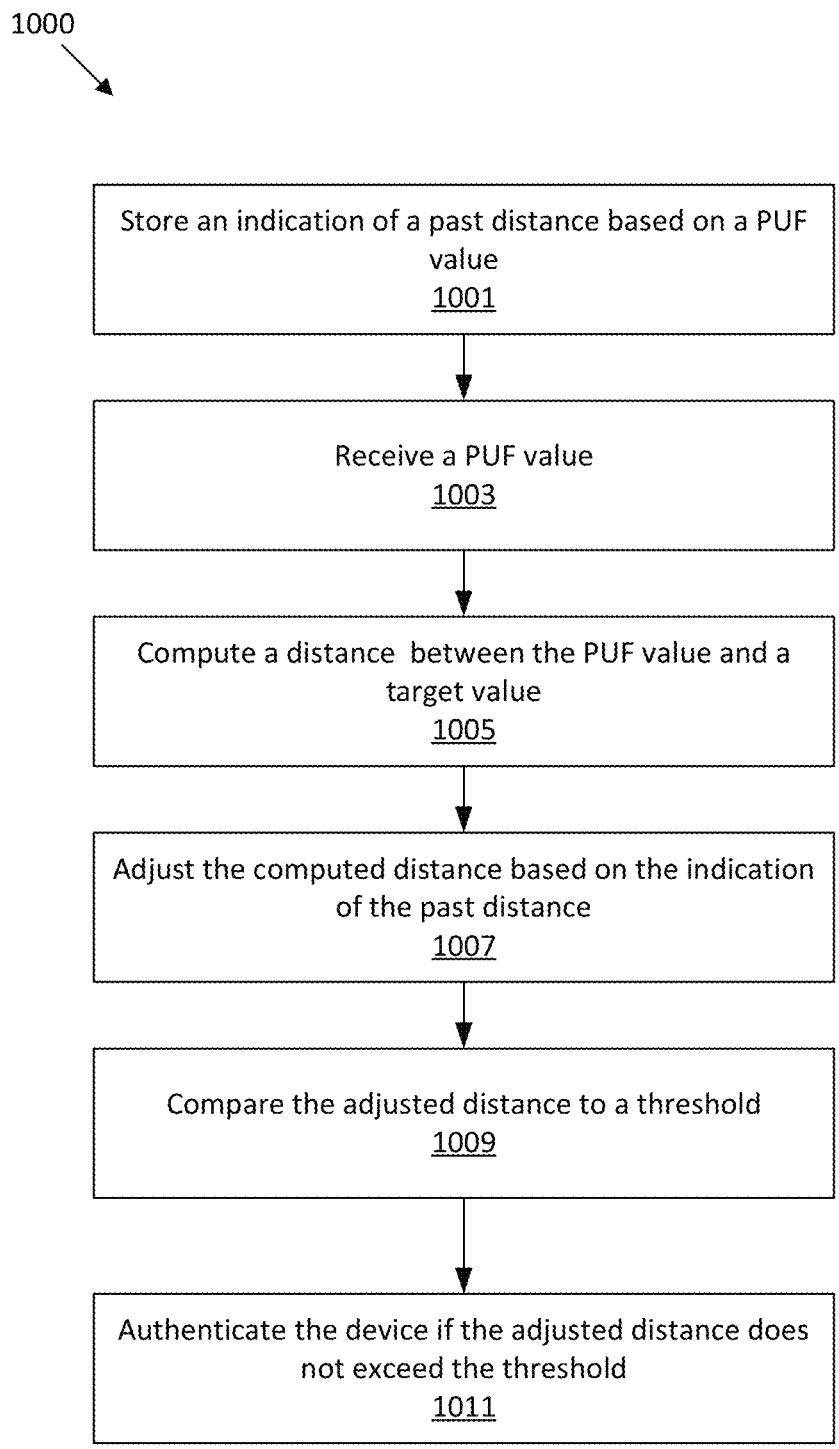
FIG. 10 shows an illustrative process flow for authenticating a device using PUF values, in accordance with some embodiments.

FIG. 10 shows an illustrative process flow 1000 for authenticating a device using PUF values, in accordance with some embodiments. FIG. 10 illustrates a process flow that may be executed using an authentication device (e.g., authentication devices 104a&B, 604, 704, and/or 804) connected to a device (e.g., devices 102a&b, 602, 702, and/or 802) operable to obtain PUF values (e.g., from PUF circuits 101a&b, 601, 701, and/or 801).

The process flow 1000 begins at act 1001, where the authentication device stores an indication of a past distance based on a PUF value. The authentication device may authenticate the device multiple times and, during one or more of the authentication processes, store the distance computed between received and stored PUF values. Any suitable indication of the computed distance may be stored, such as a moving average of one or more distances and/or an indication of the distance as a proportion of a threshold distance. In some embodiments, an aging tracking circuit may track time variations of the computed distance and produce an indication of the aging of the PUF circuit(s). In some embodiments, a distance offset, which may be a distance adjustment value, is stored and adjusted instead of or in addition to the past distance.

At act 1003, the authentication device receives one or more PUF values. The PUF values may be transmitted directly from a device or through one or more proxy devices. For example, a single device may receive PUF values for one or more edge devices and forward the PUF values to a same authentication device. The PUF values may be generated by any suitable PUF circuitry. In some embodiments, the PUF values represent digital samples of an analog signal generated by a PUF circuit.

At act 1005, the authentication device computes a distance between the received PUF values and stored PUF values. The stored PUF values may be retrieved from any suitable memory. In some embodiments, the stored PUF values are received, directly or indirectly, from the same device being authenticated during an enrollment process. The authentication device may compute any suitable distance metric between the received and stored PUF values, including Hamming and/or Euclidean distance.

At act 1007, the authentication device adjusts the computed distance based on the indication of the past distances stored at act 1001. The aging tracking circuit and/or a distance adjustment circuit may produce a distance adjustment value based on the indication of the aging of the PUF circuit(s). The computed distance and the distance adjustment value are used to adjust the computed distance, for example by adding or multiplying the two values. In some embodiments, the aging tracking circuit may compute a weighted moving average of the received PUF values. The aging tracking circuit and/or the distance adjustment circuit may then compute an adjusted distance based on the weighted moving average.

At act 1009, the authentication device compares the adjusted distance to a threshold. Comparing the adjusted distance to a threshold allows for the use of PUF values that have not been error corrected, as small discrepancies should not exceed the threshold. However, the threshold may still be small enough to uniquely identify the device. Therefore, at act 1011, the device is authenticated when the computed distance does not exceed the threshold. If the computed distance exceeds the threshold, the device is not authenticated. The distance may exceed the threshold if a valid device is tampered with. It should be appreciated that receiving multiple PUF values may make it infeasible to imitate the valid device without knowledge of the true PUF values. However, even a valid device may no longer be authenticated if aging of the PUF circuitry causes temporal variation in the PUF values that exceeds the threshold.

Figure 11:
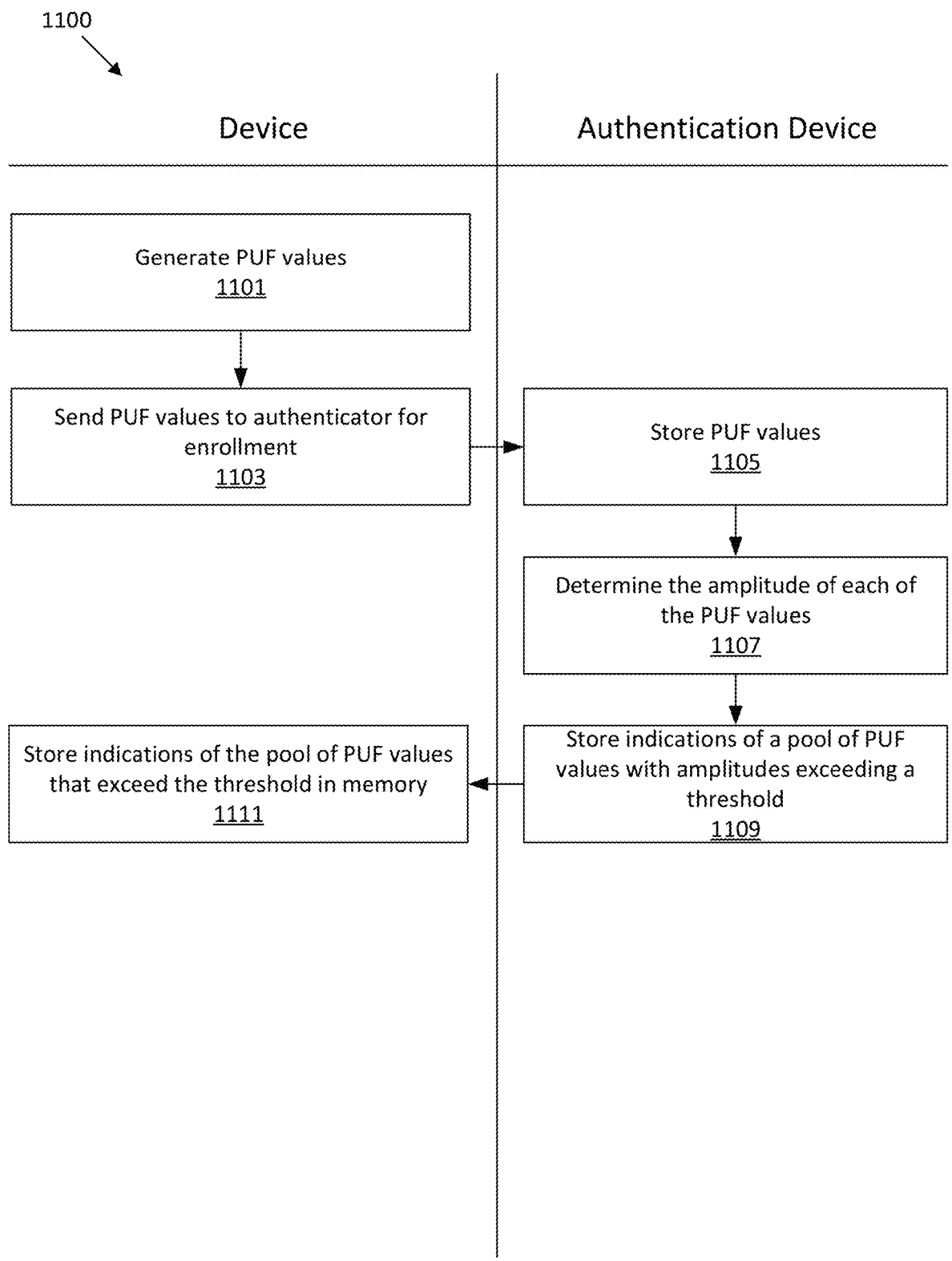
FIG. 11 shows an illustrative process flow for generating a high offset pool of PUF values, in accordance with come embodiments.

FIG. 11 shows an illustrative process flow 1100 for generating a high offset pool of PUF values, in accordance with some embodiments. FIG. 11 illustrates a process flow 1100 that may be executed using an authentication device (e.g., authentication devices 104a&B, 604, 704, and/or 804) connected to a device (e.g., devices 102a&b, 602, 702, and/or 802) operable to obtain PUF values (e.g., from PUF circuits 101a&b, 601, 701, and/or 801).

The process flow 1100 begins at act 1101, where the device generates PUF values. The PUF values may be digital representations of analog signals generated by PUF circuits. The PUF values may be digitized with enough resolution to make quantization error insubstantial compared to the PUF signal. For example, the device and PUF circuits may use and ADC with 8, 12, 16, or more bits. In some embodiments, the output of the ADC may have a sufficiently high resolution to treat the digital PUF value as an analog signal in the digital domain.

At act 1103, the device sends the PUF values to the authentication device for enrollment. In some embodiments, the enrollment process takes place in a secure environment and the PUF values may be transmitted unencrypted. In some embodiments, the PUF values may be re-enrolled and transmitted according to encryption processes described herein.

At act 1105, the authentication device stores the received PUF values in a suitable memory. At act 1107, the authentication device determines the amplitude of each of the received PUF values. The authentication device may use any suitable amplitude computation for the numeric representation of the PUF values. For example, the absolute value may be computed for PUF values in a two's complement binary format, which has a distribution centered around zero. In a positive binary format, e.g. ranging from zero to a positive number determined by the number of bits, the amplitude may be computed to be the distance between a value and the expected mean of the values.

At act 1109, the authentication device stores indications of the PUF circuits with amplitudes that exceed the threshold. In some embodiments, the authentication device may determine which PUF values are unlikely to experience bit changes in a certain number of significant bits. For example, in a signed binary representation, the authentication device may determine PUF values that are far from zero and therefore unlikely to have sign bits change due to aging or noise.

The indications of the PUF values included in the high offset pool do not directly reveal any PUF information and may be sent, unencrypted to the device. At act 1111 the device stores the indications of the PUF values in the high offset pool. In some embodiments, the device performs the same amplitude calculations as the authentication device.

Figure 12:
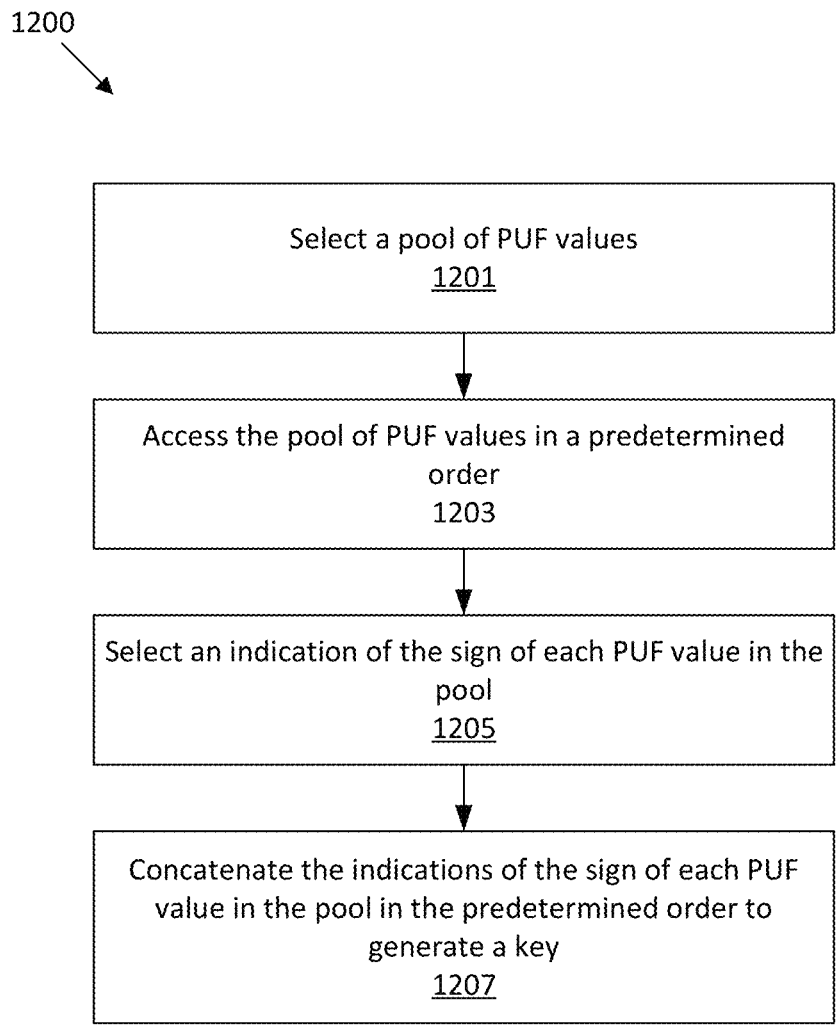
FIG. 12 shows an illustrative process flow for generating an encryption key from a pool of PUF values.

FIG. 12 shows an illustrative process flow 1200 for generating an encryption key from a pool of PUF values. FIG. 12 illustrates a process flow 1200 that may be executed using a device (e.g., devices 102a&b, 602, 702, and/or 802) operable to obtain PUF values (e.g., from PUF circuits 101a&b, 601, 701, and/or 801) and/or an authentication device (e.g., authentication devices 104a&B, 604, 704, and/or 804) connected to the device.

The process flow 1200 begins at act 1201, where the device selects a pool of PUF values. The pool of PUF values may be selected in any suitable manner. For example, FIG. 11 describes a method of selecting a pool of PUF values. The pool of PUF values may be obtained from any suitable pool of corresponding PUF circuitry.

At act 1203, the selected pool of PUF values is accessed in a predetermined order. Accessing the pool of PUF values may include retrieving PUF values from memory and/or obtaining new PUF values from PUF circuitry. In some embodiments, the PUF values may be linearly ordered and accessed in order or reverse order. In some embodiments, the pool of PUF values may be accessed based on the criteria used to generate the pool. For example, the PUF values may be accessed based on respective amplitudes of the PUF values. In some embodiments, a device and authentication device may communicate the order. For the purposes of using the pool of PUF values to generate identical keys on separate devices, any suitable deterministic or known order may be utilized.

At act 1205, an indication of the sign (e.g., positive or negative sign bit) of each PUF value in the pool is selected. At act 1207, the indications of the sign of each PUF value in the pool are concatenated in the order in which the values were accessed to generate an encryption key. If the selected pool is a high offset pool there is a high probability that the encryption key will be the same key each time the process flow 1200 is executed. Therefore, a device and authentication device may generate a same key using stored and new PUF values. In some embodiments, an indication of the most significant bits of each PUF value is selected instead of or in addition to a sign bit. It should be appreciated that the process flow 1200 may be used to generate any suitable string of bits and not just an encryption key.

Figure 13:
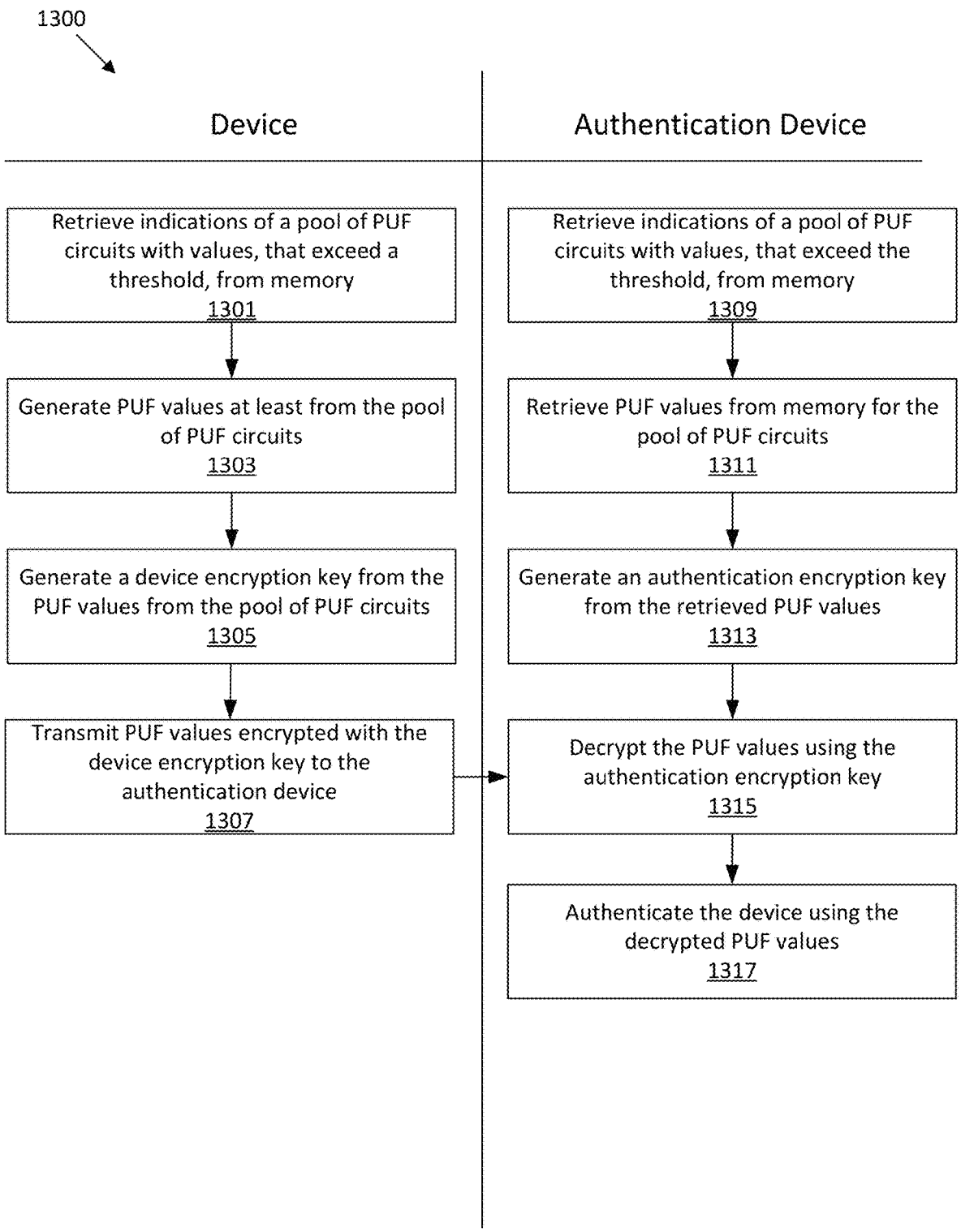
FIG. 13 shows an illustrative process flow for generating an encryption key from a pool of PUF values and authenticating a device.

FIG. 13 shows an illustrative process flow 1300 for generating an encryption key from a pool of PUF values and authenticating a device. FIG. 13 illustrates a process flow 1300 that may be executed using a device (e.g., devices 102a&b, 602, 702, and/or 802) operable to obtain PUF values (e.g., from PUF circuits 101a&b, 601, 701, and/or 801) and connected to an authentication device (e.g., authentication devices 104a&B, 604, 704, and/or 804) operable to authenticate the device.

The process flow 1300 begins at act 1301, where the device retrieves indications of a pool of PUF circuits with output values that exceed a threshold. The indications may be stored on the device following an enrollment process. In some embodiments, the indications of the pool of PUF circuits may be received from the authentication device. The pool of PUF values may be a high offset pool, for example as was discussed with reference to FIG. 11.

At act 1303, the device generates PUF values at least from the pool of PUF circuits. At act 1305, the device generates a device encryption key from the PUF values generated from the pool of PUF circuits. The device encryption key may be generated as was discussed with reference to FIG. 12.

At act 1307, the device uses the device encryption key to encrypt PUF values for authentication and transmits the encrypted values to the authentication device. Before the authentication device can decrypt the received PUF values and authenticate the device, the authentication device must generate a key that is operable to decrypt the message. In some embodiments, the authentication device generates a key identical to the key generated on the device.

At act 1309, the authentication device retrieves indication of a pool of PUF circuits with values that exceed the same threshold used by the device. At act 1311, the authentication device retrieves the PUF values from memory for the pool of PUF circuits. At act 1313, the authentication device generates an authentication encryption key from the retrieved PUF values. As was the case with the device, the authentication device may generate the authentication key from a high offset pool as was discussed with reference to FIGS. 11 and 12.

When the device is valid and suitable to be authenticated (e.g. has not been tampered with) and a high offset pool of PUF circuits are used to generate the keys, there is a high likelihood that the authentication device and the device will generate identical keys. Since the indication of the PUF value pool do not reveal PUF information, the identical keys may be generated without exchanging secret information after the PUF values are exchanged in the enrollment process. At act 1315, the authentication device decrypts the received PUF values using the authentication encryption key. At act 1317, the authentication device authenticates the device using the decrypted PUF values. For example, the device may be authenticated as was discussed with reference to FIGS. 9 and 10 or by any suitable method.

Figure 14:
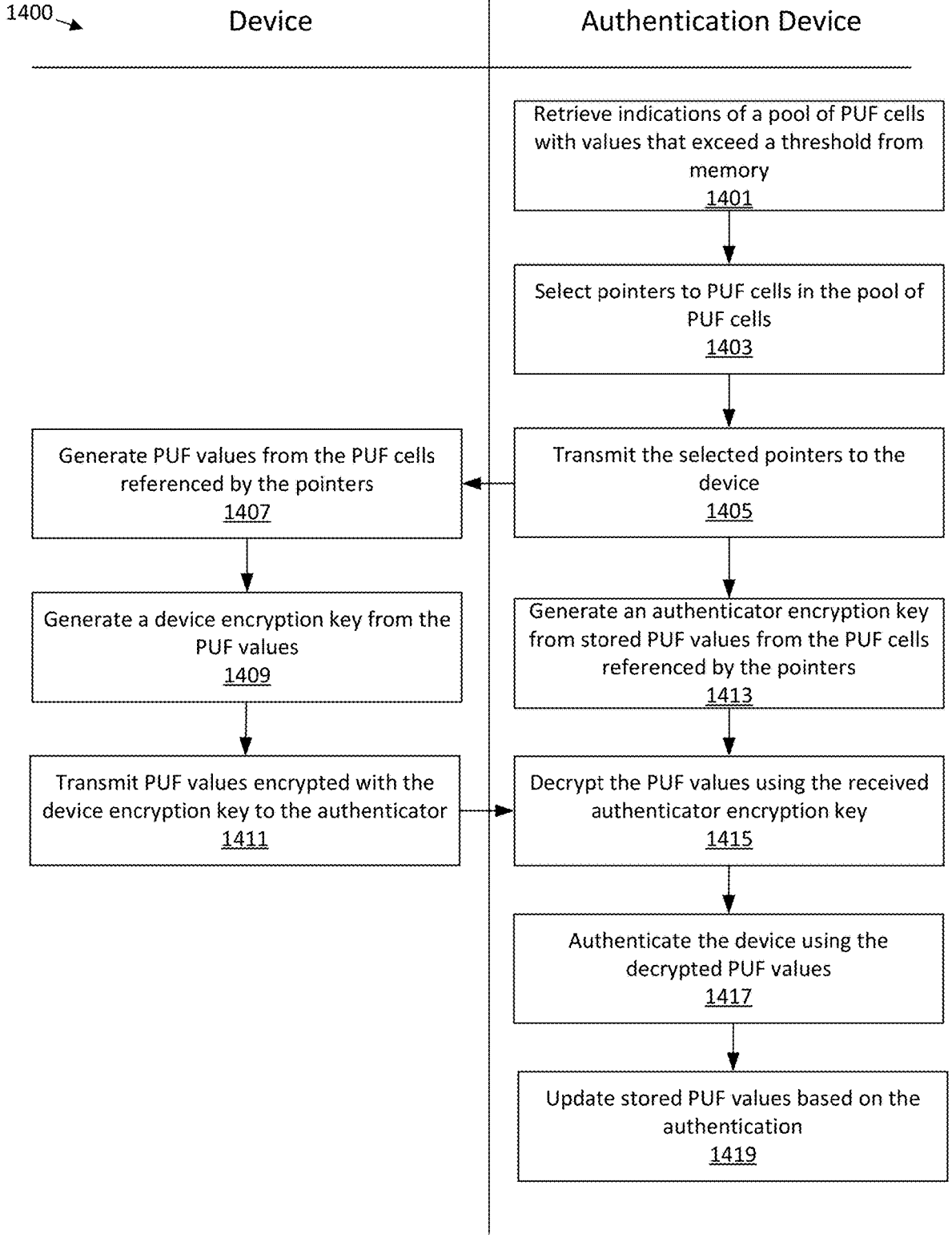
FIG. 14 shows an illustrative process flow for generating an encryption key from a pool of PUF values and authenticating a device.

FIG. 14 shows an illustrative process flow 1400 for generating an encryption key from a pool of PUF values and authenticating a device. FIG. 14 illustrates a process flow 1300 that may be executed using a device (e.g., devices 102a&b, 602, 702, and/or 802) operable to obtain PUF values (e.g., from PUF circuits 101a&b, 601, 701, and/or 801) connected to an authentication device (e.g., authentication devices 104a&B, 604, 704, and/or 804) operable to authenticate the device.

The process flow 1400 begins at act 1401, where the authentication device obtains indications of a pool of PUF circuits with values that exceed a threshold. For example the PUF circuits may be a high offset pool as discussed with reference to FIG. 11. At act 1403, the authentication device selects pointers to PUF circuits in the pool of PUF circuits. For example, the authentication device may select k random keys out of n in the pool. For example, the authentication device may pick 64, 80, or any suitable number of PUF circuits in a high offset pool of 128, 256, 1024, or any suitable number of PUF circuits. In some embodiments, the authentication device selects the pointers according to an encryption protocol that may determine the order of selection and/or the number of PUF values selected. For example, the PUF values may be selected to form a stream cipher.

At act 1405, the authentication device transmits the selected pointers to the device. The pointers may be transmitted unencrypted to the device since the pointers to do not reveal the PUF values. In some embodiments, the pointers may be encrypted using an existing encryption key. At act 1407, the device obtains PUF values from the PUF circuits references by the received pointers.

At act 1409, the device generates a device encryption key from the PUF values generated at act 1407. In some embodiments, the device generates an encryption key according to the process discussed with reference to FIG. 12. The device may generate the encryption key according to any suitable protocol. At act 1413, the authentication device generates an authentication encryption key using stored PUF values from the PUF circuits referenced by the pointers sent to the device. The authentication device may generate the authentication key using the same operations on the PUF values as the device in order to generate the same key in both devices. In some embodiments, the authentication device generates a decryption key that is configured to decrypt messages from the device that is not identical to the device encryption key, for example when the device is configured to perform asymmetric encryption.

At act 1411, the device transmits PUF values encrypted using the device encryption key to the authentication device. At act 1415, the authentication device decrypts the PUF values from the device using the authentication encryption key. It is not necessary for the device to provide any indication of the key used to encrypt the PUF values, since the authentication device should be able to generate an operable key for a valid device that generates a pool of sufficiently matched PUF values.

At act 1417, the authentication device uses the decrypted PUF values to authenticate the device. The device may be authenticated, for example, using the processes discussed with reference to FIGS. 9&10. Since the encryptions keys needed to transmit the PUF values are generated based on the PUF values, it is likely that the device will be successfully authenticated. An invalid device, such as a device imitating a device to be authenticated, would be unlikely to successfully generate an operable encryption key. However, the authentication process may provide an indication that the distance between received and stored PUF values in undergoing a time variation due to aging. At act 1419, the authentication device updates the stored PUF values based on the authentication, for example as was discussed with reference to FIGS. 7, 9, and 10.

Figure 15:
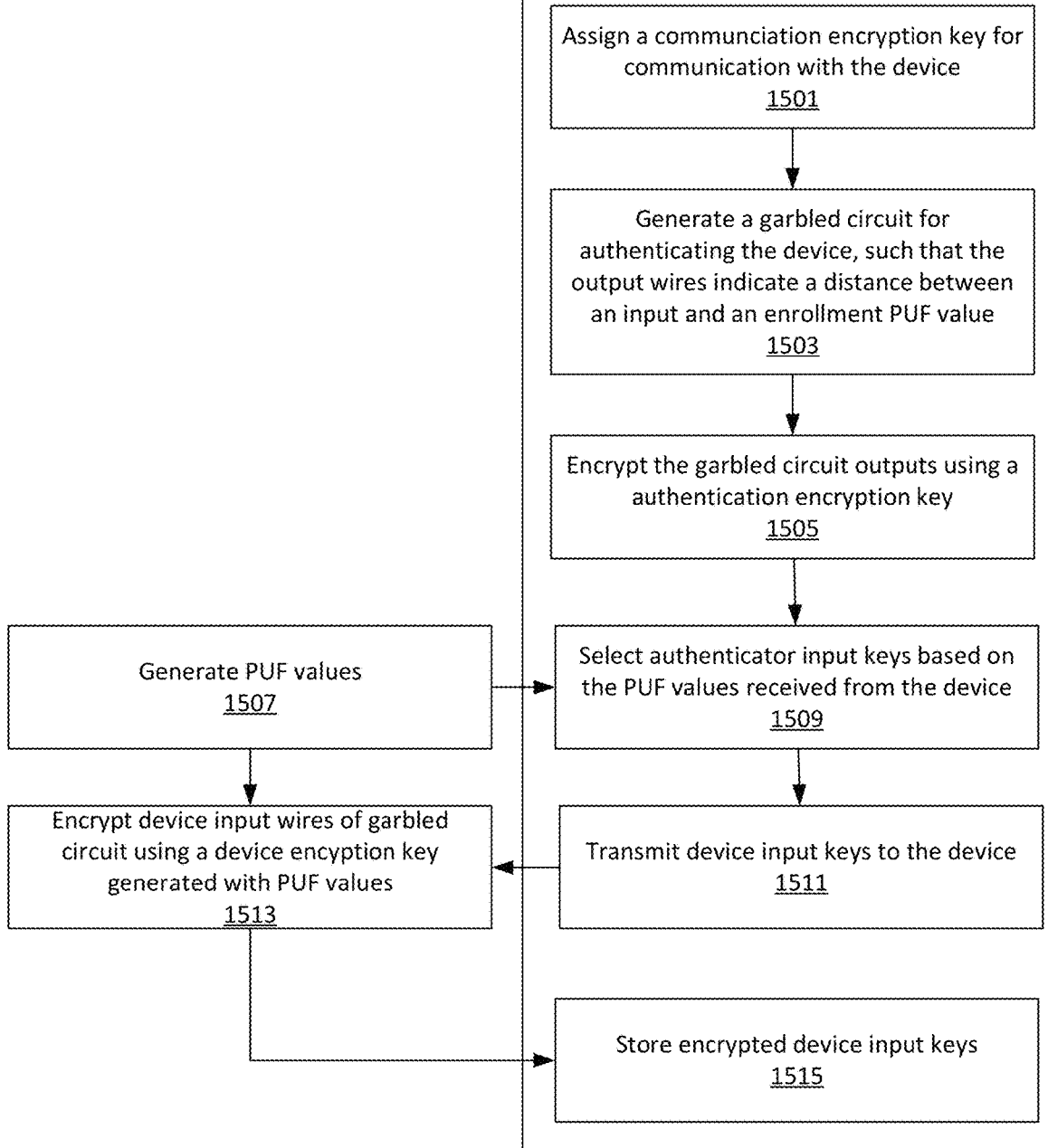
FIG. 15 shows an illustrative process flow for enrolling a device in an authentication protocol using a garbled circuit, in accordance with some embodiments.

FIG. 15 shows an illustrative process flow 1500 for enrolling a device in an authentication protocol using a garbled circuit, in accordance with some embodiments. FIG. 15 illustrates a process flow 1500 that may be executed using a device (e.g., devices 102a&b, 602, 702, and/or 802) operable to obtain PUF values (e.g., from PUF circuits 101a&b, 601, 701, and/or 801) and connected to an authentication device (e.g., authentication devices 104a&B, 604, 704, and/or 804).

At act 1501, the authentication device assigns a communication encryption key for communication with the device. The encryption key may be a symmetric encryption key. In some embodiments, the device does not need to perform asymmetric encryption, which can substantially reduce the resources required by the device. The communication encryption key may be shared with the device in any suitable manner. For example, the communication key may be transferred to the device after the assignment. In some embodiments, the authentication device and the device use a key exchange protocol. The device may store the encryption key in an encrypted format, for example by encrypting the communication key using PUF values. In some embodiments, the device encrypts the communication key and the authentication device transmit the encrypted key value to the device during each authentication.

At act 1503, the authentication device generates a garbled circuit for authenticating the device. At least a portion of the output wires of the garbled circuit indicate a distance between an input and an enrollment PUF value. It should be appreciated that garbled circuits may be constructed to compute arbitrary functions and the garbled circuit may therefore compute any of the distance, aging tracking, aging adjustment, arithmetic functions on a nonce, or any other suitable functions. For each input and output wire, the authentication device generates an encrypted key to represent each valid input or output. The keys may be generated at random and/or selected to avoid providing any information about the input corresponding to the key.

At act 1505, the authentication device encrypts the garbled circuit outputs using an authentication encryption key. The authentication device may use a key that is unique to each device to encrypt the output wires. This may prevent certain attacks and observations of the output keys. In some embodiments, the authentication device does not encrypt the garbled circuit output keys.

At act 1507, device generates PUF values. The PUF values may be generated by any suitable PUF circuitry. The generated PUF values may be re-generated later to authenticate the device.

The PUF values are transmitted to the authentication device to be used as enrollment PUF values. At act 1509, the authentication device selects authentication input keys based on the PUF values received from the device. The authentication input keys are used as the authentication device input to the garbled circuit during the authentication process. The authentication device may store only input keys corresponding to the enrollment PUF values, to be compared to new values from the device, and delete the enrollment PUF values. This prevents an adversary from obtaining the enrollment PUF values by compromising the authentication device.

At act 1511, the authentication device transmits the device input keys to the device. The authentication device may transmit all valid device input keys to the device. For example, in a garbled circuit with two inputs for each party and accepting zero or one, the authentication device may transmit both zero and one keys for the device for each gate in the circuit. At act 1513, the device encrypts the device input keys using a device encryption key generated with PUF output values. For example, the device encryption key may be generated as was discussed with reference to FIG. 12. In some embodiments, the device encryption key is not provided to the authentication device, which prevents an adversary that compromises the authentication device from being able to decrypt the garbled circuit parameters and/or gain information about the PUF values.

At act 1515, the authentication device stores the encrypted device input keys. The encrypted keys are transmitted to the device during subsequent authentication processes so that the device can select inputs based on new PUF values.

Figure 16:
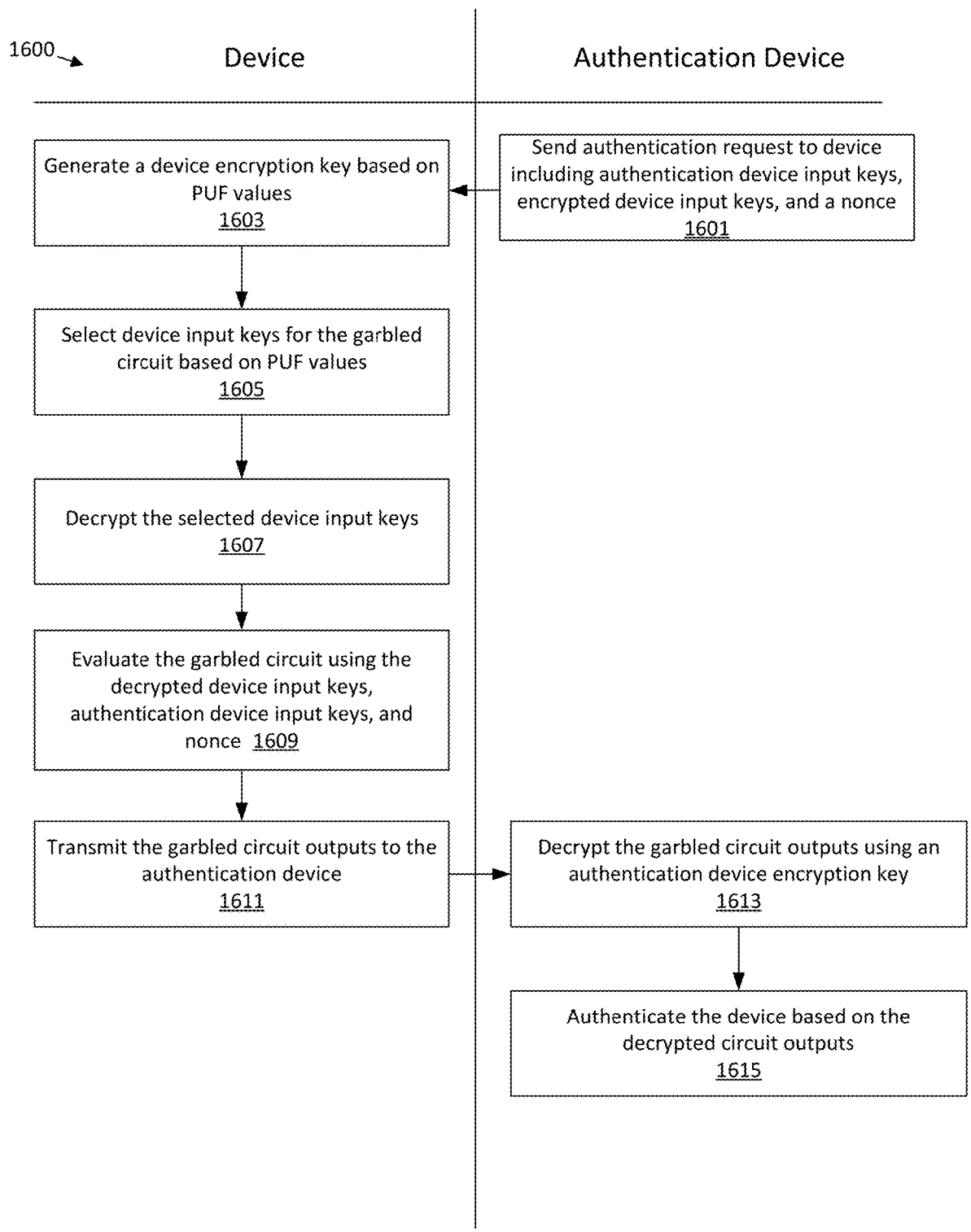
FIG. 16 shows an illustrative process flow for authenticating a device using a garbled circuit, in accordance with some embodiments.

FIG. 16 shows an illustrative process flow for authenticating a device using a garbled circuit, in accordance with some embodiments. FIG. 16 illustrates a process flow 1600 that may be executed using a device (e.g., devices 102a&b, 602, 702, and/or 802) operable to obtain PUF values (e.g., from PUF circuits 101a&b, 601, 701, and/or 801) and connected to an authentication device (e.g., authentication devices 104a&B, 604, 704, and/or 804). The process flow 1600 may utilize a garbled circuit generated with enrollment values as was discussed with reference to FIG. 15.

The process flow 1600 begins at act 1601, where the authentication device sends an authentication request to the device. The authentication request may include garbled circuit parameters including authentication input keys, encrypted device input keys, and a nonce. The authentication device may also transmit garbled circuit tables and output wire values.

At act 1603, the device generates a device encryption key based on PUF output values. In some embodiments, the device generates the encryption key as was discussed with reference to FIGS. 12 and 15. At act 1605, the device selects device input keys for the garbled circuit based on the PUF values. For each gate of the garbled circuit, the device selects the input key (e.g., either zero or one) that corresponds to each input bit of the PUF values. At act 1607, the device decrypts the selected device input keys.

At act 1609, the device evaluates the garbled circuit using the decrypted device input keys, the authentication input keys, and the nonce. The nonce may correspond to a portion of the device and authentication input keys. The garbled circuit may compute any suitable function on the nonce and produce any suitable outputs to prevent a garbled circuit output from being re-used, which prevents replay attacks in which an imitation device replays valid garbled circuit outputs to gain authentication. In some embodiments, the circuit output may include the nonce, an indication that the input keys representing the nonce equaled the authentication keys representing the nonce, a mathematical function of the nonce (e.g., nonce minus a constant), and/or any other suitable information about the nonce.

At act 1611, the device transmits the garbled circuit output to the authentication device. In some embodiments, the output wires of the garbled circuit are encrypted by the authentication device. In some embodiments, all or a portion of the outputs of the garbled circuit are not revealed to the device. The transmission may be encrypted using a communication encryption key, which may be a shared key. At act 1613, the outputs of the garbled circuit are decrypted using an authentication encryption key.

At act 1615, the authentication device authenticates the device based on the decrypted circuit outputs. In some embodiments, the output of the garbled circuit is the distance between the PUF values. It should be appreciated that garbled circuits may be constructed to compute arbitrary functions and the garbled circuit may therefore compute any of the distance, aging tracking, aging adjustment, arithmetic functions on a nonce, or any other suitable functions. For example, the garbled circuit may compute the distance as was discussed with reference to FIGS. 8, 9, and 10.

Figure 17:
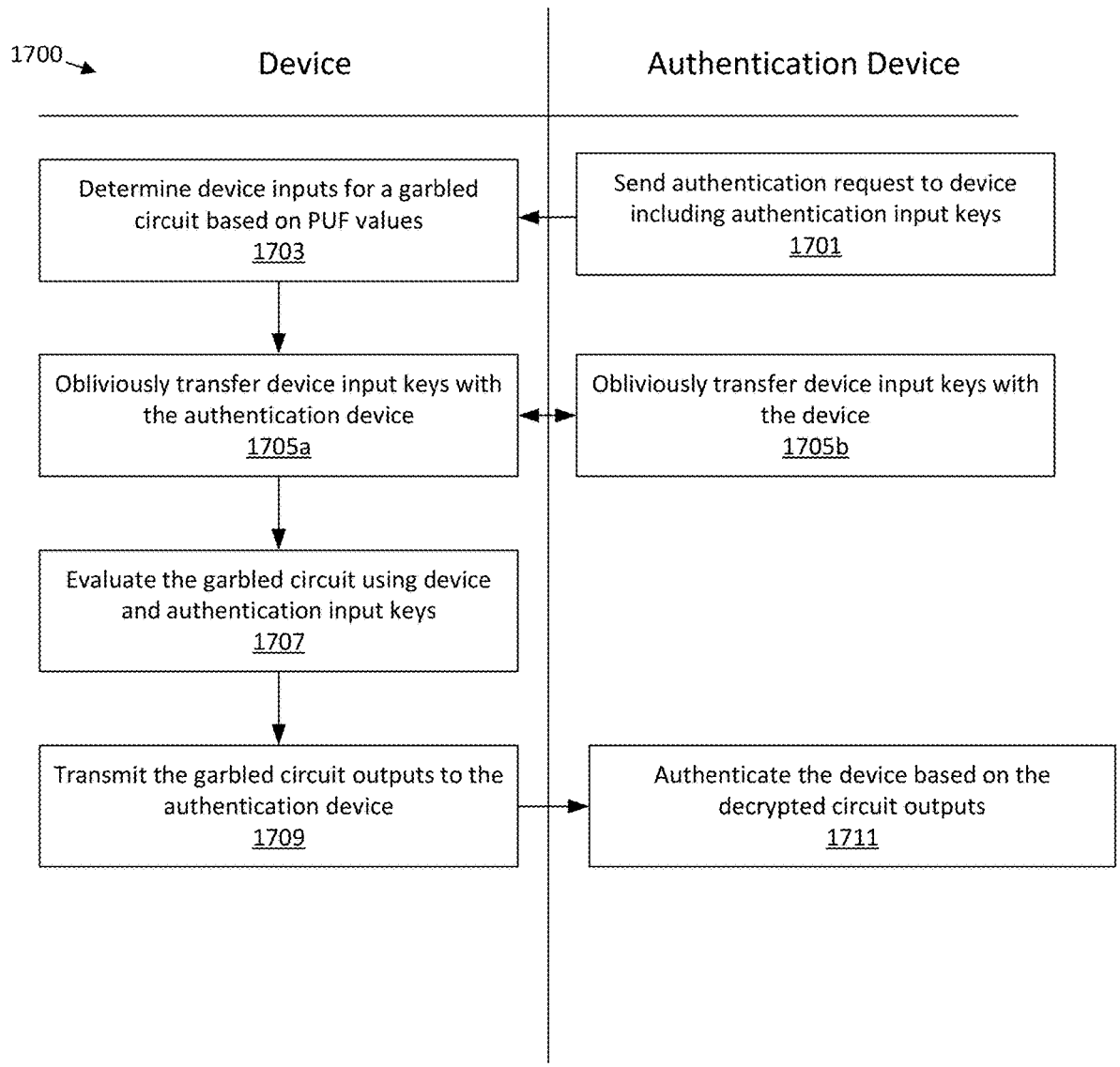
FIG. 17 shows an illustrative process flow for authenticating a device using a garbled circuit with oblivious transfer, in accordance with some embodiments.

FIG. 17 shows an illustrative process flow for authenticating a device using a garbled circuit with oblivious transfer, in accordance with some embodiments. FIG. 17 illustrates a process flow 1700 that may be executed using a device (e.g., devices 102a&b, 602, 702, and/or 802) operable to obtain PUF values (e.g., from PUF circuits 101a&b, 601, 701, and/or 801) and connected to an authentication device (e.g., authentication devices 104a&B, 604, 704, and/or 804).

The process flow begins at act 1701, where the authentication device sends an authentication request to the device including authenticator input keys. The authentication request may also include garbled circuit truth tables. At act 1703, the device determines device inputs for the garbled circuit based on PUF values. For each gate of the garbled circuit, the device selects the input key (e.g., either zero or one) that corresponds to each input bit of the PUF values.

At acts 1705a and 1705b, the device and the authentication perform an oblivious transfer protocol. In some embodiments, the device and the authentication device are configured to perform asymmetric encryption and can therefore obliviously transfer the device input keys without the authentication device learning the device input keys.

At act 1707, the device evaluates the garbled circuit using the obliviously transferred device input keys and the authentication input keys. The nonce may correspond to a portion of the device and authentication input keys. The garbled circuit may compute any suitable function on the nonce and produce any suitable outputs to prevent a garbled circuit output from being re-used, which prevents replay attacks in which an imitation device replays valid garbled circuit outputs to gain authentication. In some embodiments, the circuit output may include the nonce, an indication that the input keys representing the nonce equaled the authentication keys representing the nonce, a mathematical function of the nonce (e.g., nonce minus a constant), and/or any other suitable information about the nonce.

At act 1709, the device transmits the garbled circuit output to the authentication device. In some embodiments, the output wires of the garbled circuit are encrypted by the authentication device. In some embodiments, all or a portion of the outputs of the garbled circuit are not revealed to the device. The transmission may be encrypted using a communication encryption key, which may be a shared key.

At act 1711, the authentication device authenticates the device based on the garbled circuit outputs. In some embodiments, the outputs of the garbled circuit are encrypted by the authentication device prior to the evaluation of the circuit. In some embodiments, the output of the garbled circuit is the distance between the PUF values. It should be appreciated that garbled circuits may be constructed to compute arbitrary functions and the garbled circuit may therefore compute any of the distance, aging tracking, aging adjustment, arithmetic functions on a nonce, or any other suitable functions. For example, the garbled circuit may compute the distance as was discussed with reference to FIGS. 8, 9, and 10.

In some embodiments, the authentication device may generate new parameters for the garbled circuit after one or more authentications. Each authentication may take place with a new set of parameters. For example, if the garbled circuit were used multiple times, it may be possible for a malicious device (one impersonating a valid device to be authenticated) to request, via oblivious transfer, all valid input keys and evaluate the circuit on any input of its choosing. Additionally, re-computing the garbled circuit may prevent reply attacks since the circuit outputs will be different and replayed values will be invalid. In some embodiments, the device and/or the authentication device may generate one or more cryptographic proofs to ensure that the garbled circuit is a valid authentication circuit that has not been compromised by an adversary.

Figure 18:
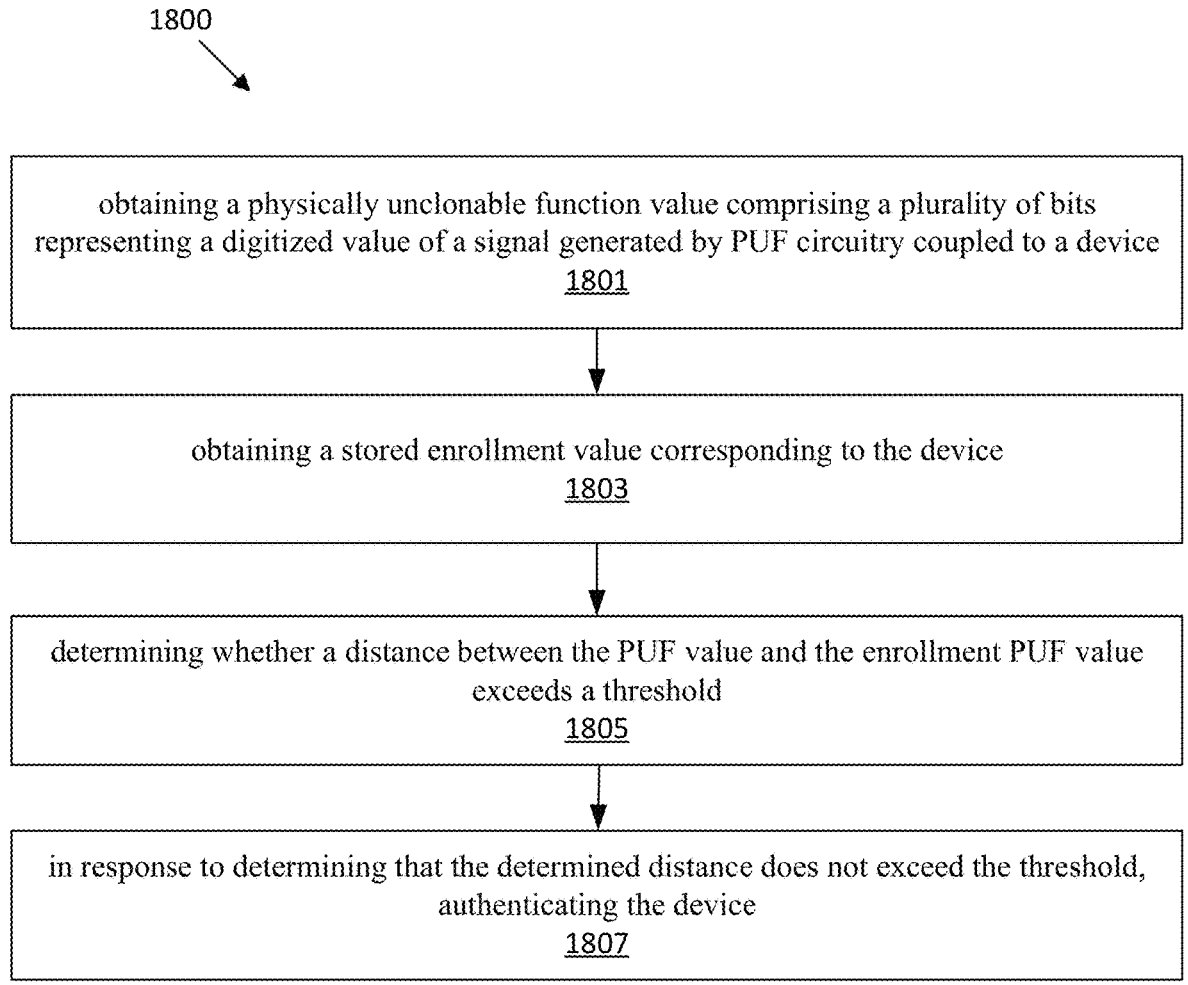
FIG. 18 shows an illustrative process flow for a computer implemented method for authenticating a device.

FIG. 18 shows an illustrative process flow 1800 for a computer implemented method for authenticating a device. The illustrated process flow 1800 may be executed using an authentication device (e.g., authentication devices 104*a*&B, 604, 704, and/or 804) to authenticate a device (e.g., devices 102*a*&*b*, 602, 702, and/or 802) operable to obtain PUF values (e.g., from PUF circuits 101*a*&*b*, 601, 701, and/or 801).

Process flow 1800 begins at act 1801, where a physically unclonable function value comprising a plurality of bits representing a digitized value of a signal generated by PUF circuitry coupled to the device is obtained. The PUF circuit may be integral to the device. In some embodiments, a plurality of PUF values may be generated by a plurality of PUF circuits coupled to the device. In some embodiments, a subset of the plurality of PUF circuits that generate values that exceed an amplitude threshold may be identified. The PUF value may be generated by a PUF circuit selected from the subset. The subset of PUF circuits may be used to generate a cryptographic key.

In some embodiments, the PUF value may be included in an encrypted message. A decryption key may be generated based on a plurality of stored PUF values corresponding to the device, and the message may be decrypted.

At act 1803, a stored enrollment value corresponding to the device is obtained. In some embodiments, a plurality of enrollment values may obtained that correspond to a plurality of PUF circuits.

At act 1805, it is determined whether a distance between the PUF value and the enrollment value exceeds a threshold. In some embodiments, the enrollment value may be adjusted to compensate for time variation of signals generated by the PUF circuitry. In some embodiments, the computed distance may be adjusted based on a PUF aging adjustment value. In further embodiments, it is determined whether multiple distances between multiple PUF values and respective enrollment values exceed a threshold.

In some embodiments, is it determined whether a distance between the PUF value and the enrollment value exceeds a smaller threshold, indicating a smaller distance, than the authentication threshold. The enrollment value(s) may be adjusted when the computed distance exceeds the smaller threshold and not the authentication threshold.

At act 1807, in response to determining that the computed distance does not exceed the threshold, the device is authenticated. The device may not be authenticated if the distance exceeds the threshold.

Figure 19:
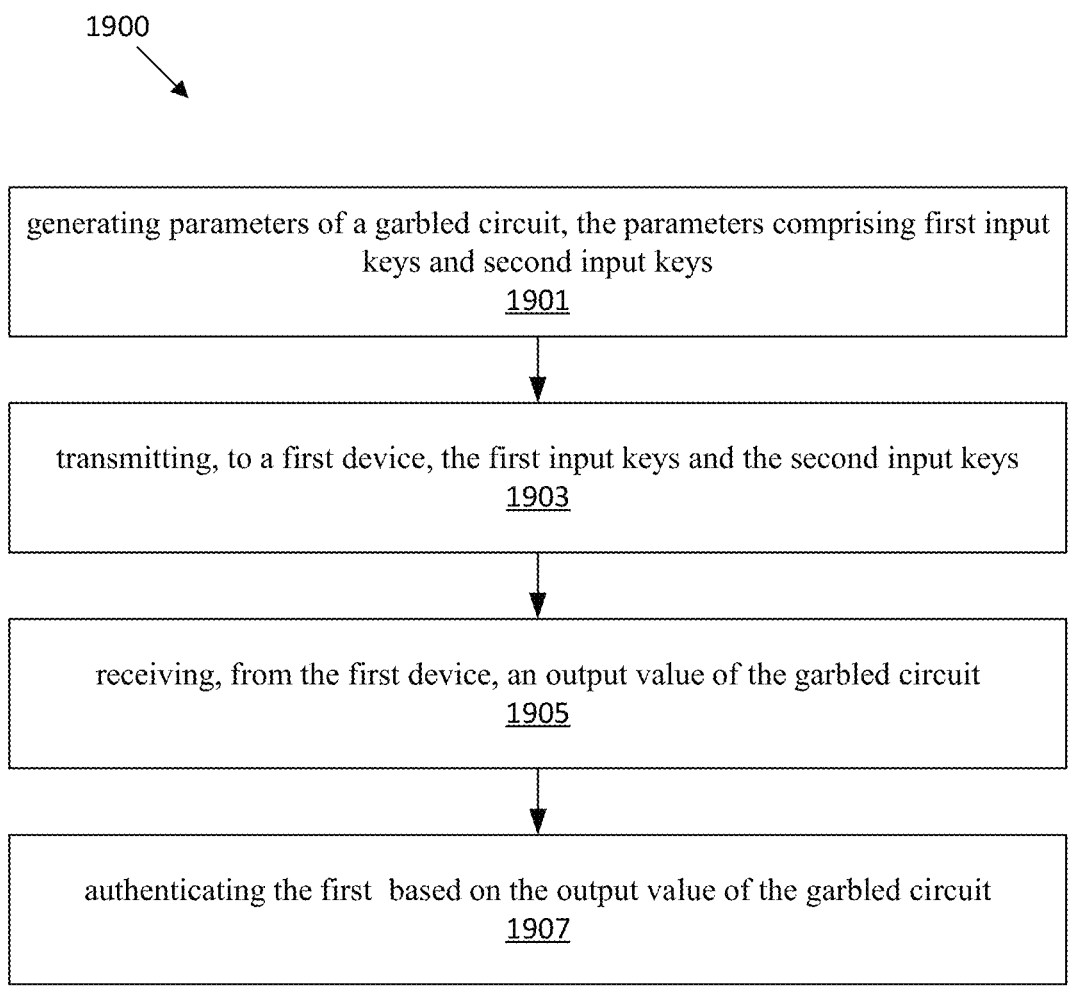
FIG. 19 shows an illustrative process flow for a computer implemented method for authenticating a first device communicatively coupled to a second device via at least one network.

FIG. 19 shows an illustrative process flow 1900 for a computer implemented method for authenticating a first device communicatively coupled to a second device via at least one network. The illustrated process flow 1900 may be executed using an authentication device (e.g., authentication devices 104*a*&B, 604, 704, and/or 804) to authenticate a device (e.g., devices 102*a*&*b*, 602, 702, and/or 802) operable to obtain PUF values (e.g., from PUF circuits 101*a*&*b*, 601, 701, and/or 801).

At act 1901, parameters of a garbled circuit are generated. The parameters include first input keys and second input keys. The output wires of the garbled circuit may be encrypted. The input keys may be randomly generated numbers.

Prior to act 1903, the authentication device and device may conduct an enrollment process. The first input keys may be transmitted to the device. The device may encrypt the first input keys, and the authentication device may receive the encrypted first input keys. Additionally, the authentication device may receive enrollment PUF values from the device and assign respective second input keys to bits in each of the PUF values. The enrollment values may be deleted after the second input keys are assigned.

At act 1903, the first input keys and the second input keys are transmitted to the device. In some embodiments, all valid first input keys are transferred. In some embodiments, the first input keys are transferred using an oblivious transfer.

At act 1905, an output value of the garbled circuit is received from the device. The output value may have been encrypted at act 1901 and is decrypted using a corresponding key. The output of the garbled circuit may indicate the distance between PUF values generated by the device and the enrollment PUF values.

At act 1907, the device is authenticated based on the output value of the garbled circuit.

Figure 20:
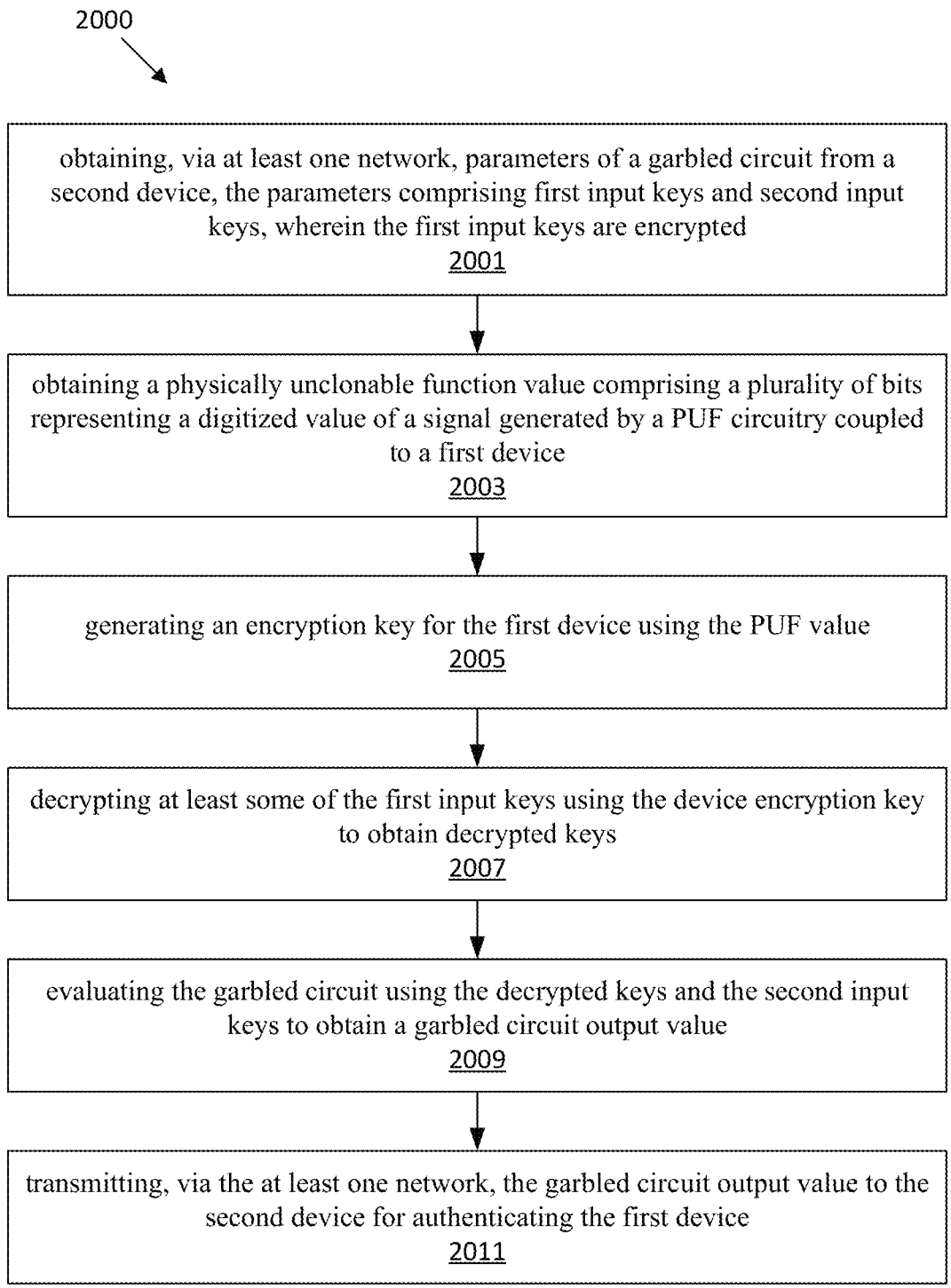
FIG. 20 shows an illustrative process flow for a computer implemented method for authenticating a first device communicatively coupled to a second device via at least one network.

FIG. 20 shows an illustrative process flow 2000 for a computer implemented method for authenticating a first device communicatively coupled to a second device via at least one network. The illustrated process flow 1900 may be executed using a device (e.g., devices 102*a*&*b*, 602, 702, and/or 802), operable to obtain PUF values (e.g., from PUF circuits 101*a*&*b*, 601, 701, and/or 801), that is authenticated by an authentication device (e.g., authentication devices 104*a*&B, 604, 704, and/or 804).

At act 2001, parameters of a garbled circuit are obtained, via at least one network, from the second device. The parameters including first input keys and second input keys. The second input keys may correspond to enrollment PUF values. The output wires of the garbled circuit may be encrypted.

The first input keys are encrypted, for example by the first device as was discussed with reference to FIG. 19. During an enrollment process, the first device may encrypt the first input keys, encrypt the first input keys using a device encryption key, and transmit the encrypted first input keys to the second device. The first input keys may subsequently be requested using an oblivious transfer protocol. In some embodiments, all valid first input keys may be received.

At act 2003, a physically unclonable function value comprising a plurality of bits representing a digitized value of a signal generated by a PUF circuitry coupled to the first device is obtained.

At act 2005, a first device encryption key is generated using the PUF value. In some embodiments, a subset of multiple PUF circuits that generate PUF values that exceed an amplitude threshold may be identified, and digitized values of signals generated by the subset of PUF circuits may be combined to generate the first device encryption key.

At act 2007, at least some of the first input keys are decrypted using the first device encryption key to obtain decrypted keys. A subset of the first input keys corresponding to the plurality of bits of the PUF value may be selected for decryption.

At act 2009, the garbled circuit is evaluated using the decrypted keys and the second input keys to obtain a garbled circuit output value.

At act 2011, the garbled circuit output value is transmitted, via the at least one network to the second device for authenticating the first device. In some embodiments, the output of the garbled circuit is encrypted in a manner that the first device is not configured to decrypt.

Figure 21:
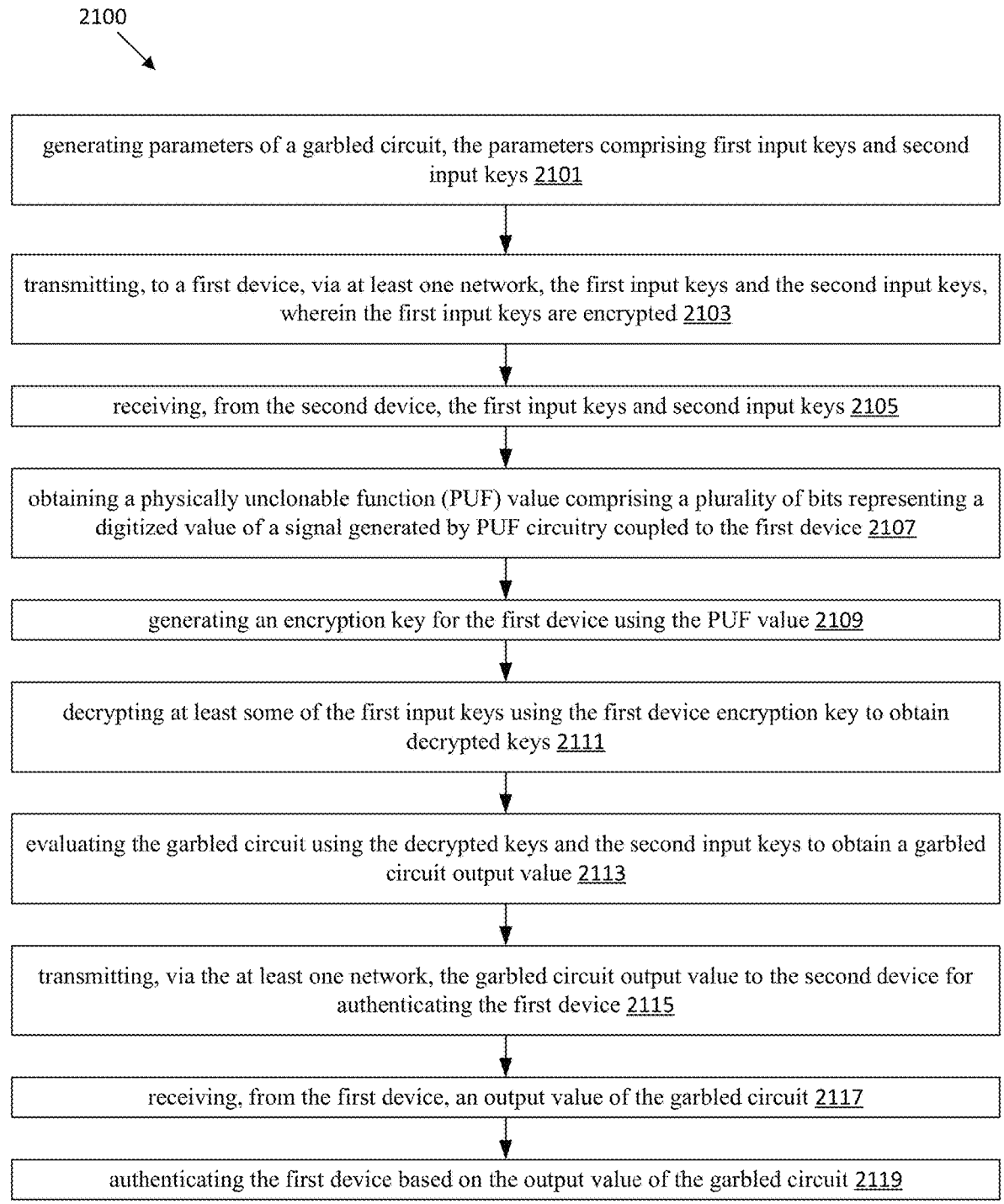
FIG. 21 shows an illustrative process flow for a method for authenticating a first device communicatively coupled to a second device via at least one network.

FIG. 21 shows an illustrative process flow 2100 for a method for authenticating a device communicatively coupled to a second device. The illustrated process flow 2100 may be executed using an authentication device (e.g., authentication devices 104a&B, 604, 704, and/or 804) to authenticate a device (e.g., devices 102a&b, 602, 702, and/or 802) operable to obtain PUF values (e.g., from PUF circuits 101a&b, 601, 701, and/or 801).

Acts 2101 and 2103 may be performed using an authentication device. At act 2101, parameters of a garbled circuit are generated. The parameters include first input keys and second input keys. At act 2103, the first input keys and the second input keys are transmitted to the first device.

Acts 2104-2115 may be performed by the first device.

At act 2101, parameters of a garbled circuit are obtained, via at least one network, from the second device. The parameters including first input keys and second input keys. The first input keys are encrypted.

At act 2103, a physically unclonable function (PUF) value comprising a plurality of bits representing a digitized value of a signal generated by a PUF circuitry coupled to the first device is obtained.

At act 2105, a device encryption key is generated using the PUF value.

At act 2007, at least some of the first input keys are decrypted using the first device encryption key to obtain decrypted keys.

At act 2109, the garbled circuit is evaluated using the decrypted keys and the second input keys to obtain a garbled circuit output value.

At act 2111, the garbled circuit output value is transmitted, via the at least one network to the second device for authenticating the first device.

Acts 2117 and 2119 may be performed using an authentication device. At act 2117, an output value of the garbled circuit is received from the first device. At act 2119, the first device is authenticated based on the output value of the garbled circuit.

In some examples, the components disclosed herein may read parameters or instructions that affect the functions performed by the components. These parameters or instructions may be physically stored in any form of suitable memory including volatile memory (such as RAM) or nonvolatile memory (such as a magnetic hard drive). In addition, the parameters or instructions may be logically stored in a propriety data structure (such as a database or file defined by a user space application) or in a commonly shared data structure (such as an application registry that is defined by an operating system). In addition, some examples provide for both system and user interfaces that allow external entities to modify the parameters and instructions and thereby configure the behavior of the components.

Based on the foregoing disclosure, it should be apparent to one of ordinary skill in the art that the embodiments disclosed herein are not limited to a particular computer system platform, processor, operating system, network, or communication protocol. Also, it should be apparent that the embodiments disclosed herein are not limited to a specific architecture.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Use of at least one of and a list of elements (e.g., A, B, C) is intended to cover any one selection from A, B, C (e.g., A), any two selections from A, B, C (e.g., A and B), any three selections (e.g., A, B, C), etc., and any multiple of each selection.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for authenticating a first device communicatively coupled to a second device via at least one network, the method comprising:
using the first device to perform acts of:
obtaining, via the at least one network, parameters of a garbled circuit from the second device, the parameters comprising first input keys and second input keys, wherein the first input keys are encrypted, and wherein the first input keys are different from the second input keys;
- obtaining a physically unclonable function (PUF) value comprising a plurality of bits representing a digitized value of a signal generated by a PUF circuitry coupled to the first device;
- generating an encryption key for the first device using the PUF value;
- decrypting at least some of the first input keys using the first device encryption key to obtain decrypted keys;
- evaluating the garbled circuit using the decrypted keys and the second input keys to obtain a garbled circuit output value; and
- transmitting, via the at least one network, the garbled circuit output value to the second device for authenticating the first device.

2. The method of claim 1, wherein obtaining the parameters of the garbled circuit comprises:
- requesting the first input keys and receiving the first input keys using an oblivious transfer protocol with the second device.

3. The method of claim 1, further comprising:
- receiving, from the second device, all valid first input keys, wherein the valid input keys are associated with inputs to the garbled circuit.

4. The method of claim 1, wherein the output value of the garbled circuit is encrypted.

5. The method of claim 1, further comprising using the first device to perform, prior to obtaining the parameters of the garbled circuit from the second device, acts of:
- obtaining, via the at least one network, from the second device, unencrypted input keys;
- encrypting the unencrypted input keys using a device encryption key during an enrollment process to obtain the first input keys; and
- transmitting, via the at least one network, the first input keys to the second device.

6. The method of claim 1, wherein the first device is connected to a plurality of PUF circuits, wherein generating the first device encryption key using the PUF value comprises:
- identifying a subset of PUF circuits of the plurality of PUF circuits, the subset of PUF circuits generating respective signals with amplitudes that exceed a threshold; and
- combining digitized values of the signals generated by the subset of PUF circuits.

7. The method of claim 1, wherein decrypting the at least some of the first input keys using the first device encryption key to obtain decrypted keys comprises:
- selecting a subset of the first input keys corresponding to the plurality of bits of the PUF value; and
- decrypting the selected subset of the first input keys.

8. The method of claim 1, wherein the second input keys correspond to an enrollment value corresponding to the first device, and further wherein the garbled circuit output value corresponds to a distance between the PUF value and an enrollment value for the first device.

9. The method of claim 1, wherein the parameters further comprise a nonce.

10. A method for authenticating a first device communicatively coupled to a second device via at least one network, the method comprising:
- using the second device to perform the acts of:
  - generating parameters of a garbled circuit, the parameters comprising:
    - encrypted first input keys, and
    - second input keys different from the encrypted first input keys, wherein the second input keys correspond to an enrollment value corresponding to the first device, wherein the enrollment value comprises a plurality of bits, wherein generating the parameters of the garbled circuit comprises generating second input keys, which comprises:
      - obtaining the enrollment value; and
      - assigning a respective input key value to each of the plurality of bits, wherein assigning the respective input key value to each of the plurality of bits comprises generating a random value for each respective input key value;
  - transmitting, to the first device, the first input keys and the second input keys;
  - receiving, from the first device, an output value of the garbled circuit; and
  - authenticating the first device based on the output value of the garbled circuit.

11. The method of claim 10, wherein generating the parameters of the garbled circuit further comprises encrypting the output value of the garbled circuit.

12. The method of claim 11, wherein the method further comprises using the second device to, subsequent to receiving, from the first device, the output value of the garbled circuit, decrypt the output value of the garbled circuit.

13. The method of claim 10, wherein the method further comprises using the second device to, prior to transmitting the encrypted first input keys to the first device, during an enrollment process, perform the acts of:
- transmitting, via the network, unencrypted first input keys to the first device, wherein the first device is configured to encrypt the unencrypted first input keys; and
- receiving, via the network, the encrypted first input keys from the first device.

14. The method of claim 10, wherein transmitting the encrypted first input keys comprises transmitting the encrypted first input keys using an oblivious transfer with the first device.

15. The method of claim 10, wherein transmitting, to the first device, the encrypted first input keys comprises transmitting all of the first input keys generated for the garbled circuit using the second device.

16. The method of claim 10, wherein the garbled circuit output value corresponds to a distance between the enrollment value and a PUF value generated by the first device.

17. A method for authenticating a first device communicatively coupled to a second device via at least one network, the method comprising:
- using the second device to perform acts of:
  - generating parameters of a garbled circuit, the parameters comprising first input keys and second input keys, wherein the first input keys are different from the second input keys; and
  - transmitting, to the first device, via at least one network, the first input keys and the second input keys, wherein the first input keys are encrypted;
- using the first device to perform acts of:
  - receiving, from the second device, the first input keys and the second input keys;
  - obtaining a physically unclonable function (PUF) value comprising a plurality of bits representing a digitized value of a signal generated by a PUF circuitry coupled to the first device;

generating an encryption key for the first device using the PUF value;

decrypting at least some of the first input keys using the first device encryption key to obtain decrypted keys;

evaluating the garbled circuit using the decrypted keys and the second input keys to obtain a garbled circuit output value; and transmitting, via the at least one network, the garbled circuit output value to the second device for authenticating the first device; and using the second device to perform the acts of:

receiving, from the first device, the output value of the garbled circuit; and authenticating the first device based on the output value of the garbled circuit.

18. The method of claim 17, further comprising:

requesting the first input keys and receiving the first input keys using an oblivious transfer protocol with the second device.

19. The method of claim 17, further comprising using the first device to perform:

receiving, from the second device, all valid first input keys, wherein the valid input keys are associated with inputs to the garbled circuit.

20. The method of claim 17, wherein the output value of the garbled circuit is encrypted.

* * * * *